(12) United States Patent
Graves et al.

(10) Patent No.: US 7,542,675 B1
(45) Date of Patent: Jun. 2, 2009

(54) OPTICAL SWITCH WITH POWER EQUALIZATION

(75) Inventors: Alan Frank Graves, Kanata (CA); John Gerald, Orleans (CA); Andrew John Bryant, Hertfordshire (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 2114 days.

(21) Appl. No.: 09/580,495

(22) Filed: May 30, 2000

(51) Int. Cl.
H04J 14/00 (2006.01)

(52) U.S. Cl. .................. 398/45; 398/83; 398/94
(58) Field of Classification Search ............ 398/45, 398/82, 85, 93, 94, 83
See application file for complete search history.

(56) References Cited

U.S. PATENT DOCUMENTS

| | | | | |
|---|---|---|---|---|
| 5,812,710 | A * | 9/1998 | Sugaya | 385/27 |
| 5,986,800 | A * | 11/1999 | Kosaka | 359/341.41 |
| 6,049,413 | A * | 4/2000 | Taylor et al. | 359/337 |
| 6,134,034 | A * | 10/2000 | Terahara | 398/1 |
| 6,449,068 | B1 * | 9/2002 | Turner et al. | 398/38 |
| 6,510,261 | B2 * | 1/2003 | Sorin et al. | 385/27 |
| 6,559,984 | B1 * | 5/2003 | Lee et al. | 398/5 |
| 6,577,652 | B1 * | 6/2003 | Kamata | 370/535 |
| 6,594,046 | B1 * | 7/2003 | Nishino | 359/337 |

FOREIGN PATENT DOCUMENTS

WO WO 99/67609 12/1999
WO WO 00/76106 A1 12/2000

(Continued)

OTHER PUBLICATIONS

Xin W et al: "Chaotic Lasing Effect in a Closed Cycle in Transparent Wavelength Division Multiplexed Networks" OFC/100C '99 Optical Fiber Communication Conference/International Conference on Integrated Optics and Optical Fiber Communication. San Diego, CA, Feb. 21-26, 1999, Optical Fiber Communication Conference / International Conference on Integrated OP, Feb. 21, 1999, pp. TUR1-1-TUR1-3, XP000966878.

(Continued)

Primary Examiner—Dzung D Tran
(74) Attorney, Agent, or Firm—Withrow & Terranova, P.L.L.C.

(57) ABSTRACT

An optical intensity control system for use with an optical switch providing individual signal paths between input and output ports. The system has a optical splitters connectable to output multiplexers of the switch and also has variable optical intensity controllers (VOICs) for insertion into the individual signal paths. The VOICs individually control the intensity of optical signals present in the signal paths in accordance with intensity control signals. An equalizer is connected to the splitters and to the VOICS, for producing an estimate of the optical power of each individual switched optical signal and generating the intensity control signals. The equalizer is adapted to controllably isolate individual switched optical signals. In this way, individual and independent control of the power on each optical channel is provided, wavelength-dependent losses introduced by all the devices in the switch including the WDM devices at the output of the switch are accounted for and one optical coupler is required for each output optical fiber. Coarse equalization may be provided for each multiplexed optical signal either at the switch input or output, permitting a reduction in the dynamic range over which the VOICs inside the switch are required to operate.

52 Claims, 17 Drawing Sheets

FOREIGN PATENT DOCUMENTS

WO      WO 01/67659 A1      9/2001

OTHER PUBLICATIONS

Chu Kwang-Uk et al: "Scalable optical-path supervisory scheme using pilot tones and channel equalisers" Electronics Letters, IEE Stevenage, GB, vol. 36, No. 9, Apr. 27, 2000, pp. 817-818, XP006015153.

Yoshizawa N et al: "Reconfigurable Optical Add/Drop Multiplexer for 32Channel Dense Wavelength Division Multiplexing Systems" Proceedings of the European Conference on Networks and Optical Communications 1999. NOC'99. Broadband Access and Tecyhnology, Amsterdam: IOS Press, NL, vol. Part 1, 1999, pp. 301-307, XP000829401.

European Search Report EP 01 30 4653, Jul. 14, 2003.

* cited by examiner

| | POWER ESTIMATION MODULES 530 | TUNABLE OPTICAL BANDPASS FILTERS 610 | OPTICAL RECEIVERS 520 (NARROWBAND) / 620 (WIDEBAND) | M-OUTPUT WDD DEVICES 510 | N-INPUT SWITCH MATRICES 710, 710' |
|---|---|---|---|---|---|
| FIG. 5 | MxN | --- | MxN (NARROWBAND) | N | --- |
| FIG. 6 | N | N | N (WIDEBAND) | --- | --- |
| FIG. 7 | M | --- | M (NARROWBAND) | 1 | 1 |
| FIG. 8 | 1 | --- | 1 (WIDEBAND) | 1 | 1+CEIL(M÷N) |
| FIG. 9 | 1 | 1 | 1 (WIDEBAND) | --- | 1 |

FIG. 11

OPTICAL SWITCH WITH POWER EQUALIZATION

CROSS-REFERENCES TO RELATED APPLICATIONS

The present application is related in subject matter to co-pending U.S. patent application Ser. No. 09/511,065 to Graves et al., entitled "Switch for Optical Signals", filed on Feb. 23, 2000, assigned to the assignee of the present invention and hereby incorporated by reference herein in its entirety.

The present application is also related in subject matter to the co-pending U.S. patent application entitled "Optical Switch with Connection Verification" to Graves et al., filed on even date, assigned to the assignee of the present invention and hereby incorporated by reference herein in its entirety.

FIELD OF THE INVENTION

The present invention relates generally to systems used for switching optical wavelength channels in a wavelength division multiplexed (WDM) network and, more particularly, to optical switches and cross-connects which are required to be equipped with power equalization functionality for controlling the power of individual carriers in a WDM signal.

BACKGROUND OF THE INVENTION

The principle of wavelength division multiplexing consists of transporting, on a single optical waveguide such as a fiber, a plurality of independent data signals which respectively modulate a plurality of optical carriers occupying distinct optical wavelengths. This allows for significant savings when it is desired to increase the capacity of a network that already has optical fiber in place but where the fiber was previously used for transporting only a single optical carrier occupying a single optical wavelength. Since an optical carrier is implicitly associated with an optical wavelength, the expressions "optical carrier" and "optical wavelength" will hereinafter be used interchangeably.

In a wavelength division multiplexed (WDM) network, each optical carrier is associated with its own source and destination nodes. Where multiple optical carriers have intersecting routes, these multiple optical carriers will occupy different wavelengths of light on the same fiber. When this type of multi-carrier signal travels along a long route, amplifiers will be required at every 80 kilometers or so in order to boost the signal's optical power.

On even longer routes, a multi-carrier optical signal may not just suffer severe attenuation but it may also become distorted due to effects such as chromatic dispersion, polarization mode dispersion, signal-to-noise ratio degradation resulting from noise contributions of multiple cascaded amplifiers, and non-linearities in the optical transmission medium or in the optical components traversed along the way.

Distortion of this nature is sometimes counteracted by inserting equipment in the optical path for providing dispersion compensation or banded gain equalization. In severe cases of distortion, an array of regenerators may need to be added. In its most basic form, a regenerator array detects the data on each incoming carrier and uses the detected digital data to re-modulate a fresh (usually re-shaped and re-synchronized) optical signal on the appropriate optical wavelength. Thus, a regenerator array requires, for each wavelength it is required to regenerate, an optical receiver, electronic re-shaping and re-timing circuitry and an optical source. For a dense wavelength division multiplexing (DWDM) system with typically 32 to 160 wavelengths per fiber, this leads to a very complex regenerator array.

In order to allow the flexible interconnection of optical carriers, an optical network must be equipped with a mechanism for providing switching functionality at the optical carrier level. Traditionally, an optical interconnect mechanism is implemented either as an optical patch panel or as an electrical switch (or cross-connect) with optical-to-electrical converters at its input and electrical-to-optical converters at its output.

A cross-connect differs from a switch in that for the case of a cross-connect, the connection map is usually provisioned from a central network management tool, either automatically or manually, whereas for the case of an optical switch, the connection map can be controlled in real time and may even be controlled by the traffic content through the switch, in which case the switch is said to be self-routing. In the interest of simplicity, and because a switch inherently encompasses a cross-connect as well as a switch in the strict sense of the term, references made to a switch in the remainder of the specification should be understood to mean a cross-connect or a switch, depending on the circumstances.

While an electrical switch provides adequate switching functionality for a low density of wavelength division multiplexing, i.e., to a small number of optical carriers per fiber, those skilled in the art will appreciate that as the density of a WDM optical network grows, it becomes prohibitively expensive (both pecuniarily and from the point 1 of view of power consumption) to equip an electrical switch with sufficient optical-to-electrical and electrical-to-optical conversion resources to handle multiple incoming dense WDM signals arriving on their respective optical fibers.

To this end, the art has seen the development of the "photonic" switch (or cross-connect), which is the counterpart to the electrical switch (or cross-connect). In a photonic switch, switching is performed almost purely in the optical domain with only minimal recourse to optical-to-electrical or electrical-to-optical conversion. This advantageously results in significant reductions to the cost and complexity of the switching equipment.

A photonic switch can take on many generic forms, one of which is shown in FIG. 1 and more fully described in above-referenced co-pending U.S. patent application Ser. No. 09/511,065. The photonic switch 100 typically comprises N individual M-output wavelength division demultiplexing (WDD) devices $110_A$-$110_N$, where each WDD device is associated with a respective one of N input fibers 120 connected to a respective set of N amplifiers 125. The photonic switch 100 also comprises N individual M-input wavelength division multiplexing (WDM) devices $130_A$-$130_N$, one WDM device for each of N output optical fibers 140 connected to a respective set of N amplifiers 145.

The photonic switch 100 also comprises a photonic switch core 150 connected between the WDD devices $110_A$-$110_N$ and the WDM devices $130_A$-$130_N$ and a switch controller 160 connected to the photonic switch core 150.

On the input side of the photonic switch 100, each of the N WDD devices $110_A$-$110_N$ accepts a respective input WDM signal on a respective one of the input optical fibers 120. Each of the N WDD devices $110_A$-$110_N$ then separates the respective input WDM signal on a per-wavelength basis into a plurality (M) of input individual optical carrier signals which are provided to an input side of the photonic switch core 150 along a respective plurality (M) of demuxed input optical paths 170, which may consist of optical fibers, silica waveguides or other optical transmission media.}

The photonic switch core 150 switches the input individual optical carrier signals, thereby to produce a plurality of switched individual optical carrier signals which are carried out of the photonic switch core 150 by a plurality of demuxed switched optical paths 180. The switch controller 160 generates a connection map under external or locally generated stimulus, which connection map is provided to the photonic switch core 150 and defines the desired map of the optical channels from the input side to the output side of the photonic switch core 150. External stimulus may be provided via a control link 165.

At the output of the photonic switch core 150, each of the WDM devices 130$_A$-130$_N$ receives a respective set of demuxed switched optical paths 180 and combines the switched individual optical carrier signals thereon into a single respective WDM signal that exits the photonic switch 100 along a respective one of the output optical fibers 140.

In the illustrated embodiment, the photonic switch core 150 comprises a wavelength converting switch 190 and M optical switch matrices 150$_A$-150$_M$, one for each of the M optical wavelengths in the system. Each optical switch matrix has a set number of input ports and output ports and can be a Micro-Electro-Mechanical System (MEMS) device as described in "Free-Space Micromachined Optical-Switching Technologies and Architectures" by Lih Y. Lin of AT&T Labs-Research during OFC99 Session W14-1 on Feb. 24, 1999. This article is incorporated by reference herein. Such a MEMS device comprises a set of mirrors that are arranged in geometrical relationship with the input and output ports such that incoming light from any input port can be diverted to any output port by erecting an appropriate one of the mirrors under control of the switch controller 160.

In FIG. 1, each of the optical switch matrices 150$_A$-150$_M$ has a total of K+N input ports and K+N output ports where, it is recalled, N is the number of WDD devices 110$_A$-110$_N$ and WDM devices 130$_A$-130$_N$. For each of the optical switch matrices 150$_A$-150$_M$, each of the N input ports will be connected to the like-wavelength output port of a respective one of the WDD devices 110$_A$-110$_N$, while each of the N output ports will be connected to the like-wavelength input port of a respective one of the WDM devices 130$_A$-130$_N$. This permits optical signals of a given wavelength entering a switch matrix 150$_A$-150$_M$ to be connected to the appropriate port of any of the exiting WDM devices 130$_A$-130$_N$.

It is thus noted that each of the optical switch matrices 150$_A$-150$_M$ has K more input ports and K more output ports than are required to switch the N corresponding input individual optical carrier signals (one of which arrives from each of the N WDD devices 110$_A$-110$_N$). These additional ports are connected to the wavelength converting switch 190, with two important consequences. Firstly, optical carrier signals arriving on demuxed input optical paths 170 can be redirected towards the wavelength converting switch 190. Secondly, optical carrier signals arriving from the wavelength converting switch 190 can be output onto one of the demuxed switched optical paths 180.

The net result is that a signal on an individual optical carrier is allowed to change wavelengths on its way through the photonic switch 100 by a process which involves optical reception, opto-electronic conversion, electrical switching of the converted electrical signal to an optical source at a desired wavelength and modulation of that source's optical output. The wavelength conversion process is particularly useful when an input wavelength is already in use along the fiber path leading to a destination WDM device.

It should further be noted that the wavelength converting switch 190 also accepts a plurality of "add carriers" on a plurality (R) of add paths 192 and outputs a plurality of "drop carriers" on a plurality (R) of drop paths 194. Thus, it is seen that the wavelength converting switch 190 has a total of ((K×M)+R) inputs and a like number of outputs. Structurally, the wavelength converting switch 190 comprises a set of ((K×M)+R) electrical-to-optical converters, an electrical switch and a set of ((K×M)+R) optical-to-electrical converters that collectively function as a miniature version of an electrical switch for optical signals.

The term "wavelength converting switch" will hereinafter be used throughout the following, with the understanding that such a switch may have either purely wavelength conversion capabilities or both wavelength conversion and add/drop capabilities.

In operation, the photonic switch 100 of FIG. 1 provides purely optical switching at the optical switch matrices 150$_A$-150$_M$ and wavelength conversion (most commonly through the use of electrical switching) at the wavelength converting switch 190. Control of which input individual optical carrier signals are redirected into the wavelength converting switch 190 is provided by the switch controller 160. The switch controller 160 also provides control of the switching executed inside the wavelength converting switch 190.

With the assistance of network-level control of the wavelengths used by the various sources in the network, it is usually possible to ensure that most wavelengths can transit directly across most nodes in the network without wavelength conversion, hence ensuring that the majority of optical carriers will be sent along the desired output optical fiber 140 directly by the optical switch matrices 150$_A$-150$_M$ without involving the wavelength converting switch 190. As a result, it is usually possible to achieve a minimal blocking probability at the photonic switch 100 by selecting a relatively small value for K, i.e., by keeping most of the switching entirely in the optical domain.

The photonic switch described in part herein above and described in more detail in co-pending U.S. patent application Ser. No. 09/511,065 is an example of how developments in the field of optical switching are often stimulated by the need to accommodate the ever increasing optical wavelength density of WDM networks in general and WDM signals in particular.

In addition, the increase in density has driven up the cost associated with providing optical signal regeneration. This is largely due to the higher number of optical sources and receivers which must be provided at a regenerator site in order to handle the increased number of optical carriers per fiber, since each optical carrier has to be regenerated separately and independently. Consequently, those skilled in the art have begun to concentrate on lowering the cost of regeneration by trying to expand the reach between optical regeneration points in a dense WDM network.

The reach between optical regeneration points is limited by the build-up of degradation suffered by the optical carriers in the WDM signal which cannot be removed (and may actually be introduced) by current optical amplifiers.

Specifically, the maximum reach attainable between first and second regeneration points is limited by factors such as:
  launch power and pulse shape at the first regeneration point;
  receiver sensitivity at the second regeneration point;
  build-up of uncompensated chromatic dispersion and polarization mode dispersion along the route;
  accumulation of noise arising from cascades of intervening amplifiers;
  excessive flat gain or loss of intervening amplifiers, WDM/WDD elements, connectors, splices and fibers;

wavelength-dependent gain or loss through intervening amplifiers, WDM/WDD elements, connectors, splices and fibers; and cross-modulation and inter-modulation effects.

Many of the above factors contribute to producing a non-flat optical power spectrum of the WDM signal, i.e., the individual optical carriers will experience different amounts of gain and loss as they propagate. The resulting WDM signal with a non-flat optical power spectrum will reduce the maximum reach because optical carriers having higher power may saturate the intervening optical amplifiers, while optical carriers having lower power may not be detected with sufficient accuracy by a far-end regenerator. Consequently, the power differential between high power carriers and low power carriers has to be minimize in order to maximize the reach between regenerators.

In attempting to solve this problem, it has been realized that for a conventional point-to-point WDM system, variations in the optical power of the component carriers of a WDM signal are often correlated between one optical carrier and its neighbours in the optical spectrum, due to having undergone a common, wavelength-dependent amplitude distortion process. Conventional spectrum flattening techniques take advantage of this realization to provide "band equalization" of the power spectrum at an intermediate component between two regenerators. This type of equalization technique is now described with reference to FIG. 2.

Specifically, a band WDD device 4 may be used to separate an original WDM signal arriving on an input optical fiber 2 into a plurality of separate optical paths each consisting of a number of signals occupying mutually exclusive optical frequency bands. For simplicity of illustration, there are three groups of signals occupying three bands denoted A, B, C, but there may be five bands in a typical band equalization scenario. The three separated groups of signals are still WDM signals in their own right but have fewer carriers than the original WDM signal.

Each of the three signals in bands A, B, C passes through a respective one of a plurality of variable optical intensity controllers (VOICs) 6, 8, 10. Each of the VOICs 6, 8, 10 could be an amplifier or an attenuator having a response which is controllable within the band of interest but is irrelevant elsewhere. The outputs of the three VOICs 6, 8, 10 are then recombined by a band WDM device 12 into a recombined WDM signal provided on an output optical fiber 14.

In FIG. 2, the optical power spectrum of the original WDM signal on the input optical fiber 2 is shown at 16 and, in this example, is seen to comprise a total of fifteen optical carriers, five in each of the three broad optical frequency bands A, B, C. The correlation among the power levels of neighbouring carriers in the input optical power spectrum 16 is apparent from the diagram.

In addition, it is seen that the overall peak-to-peak power level variation (shown at 18) of the input optical power spectrum 16 is significant. However, because of the correlation among the power levels of neighbouring carriers, it is possible to identify an average power level $19_A$, $19_B$, $19_C$ in each respective band such that the peak-to-peak power level variation with respect to that average power level in that band is reduced as compared to the overall peak-to-peak power level variation 18.

In order to achieve band equalization, the gain (or attenuation) to be applied by each of the VOICs 6, 8 and 10 is set to a value which complements the estimated average power level in the corresponding band in order to bring the average power level to a target level. Since the band equalization is usually a static technique, average power level estimates can be obtained at installation time. In the case of FIG. 2, comparing the average power levels 19A, 19B and 19C in bands A, B and C (which can be estimated at installation time), it is seen that VOIC 6 should be accorded a moderate gain, VOIC 8 should be accorded a high gain and VOIC 10 should be accorded a low gain.

After applying band equalization in the manner of FIG. 2, the optical power spectrum (shown at 20) of the recombined WDM signal provided on the output optical fiber 14 is seen to have a significantly lower overall peak-to-peak power level variation (shown at 22) when compared to the overall peak-to-peak variation 18 in the original WDM signal.

However, it will be apparent that the band equalization approach does not completely remove peak-to-peak variations in the optical power spectrum of the original WDM signal. Rather, it provides a mechanism for reducing the level of variation and results in this level of reduction being traded off against implementational complexity by exploiting the correlation existing between adjacent carriers. Therefore, as seen in FIG. 2, the resultant WDM signal travelling on the output optical fiber 14 still contains wavelength-dependent variations in its optical power spectrum 20.

Furthermore, the band equalization technique illustrated in FIG. 2 does not account for wavelength-dependent power level variations which may have been introduced by the band demultiplexer 4 and the band multiplexer 12. Although not explicitly shown in FIG. 2, the optical power spectrum 20 of the output WDM signal could conceivably contain even more significant variations due to the compounded effects of the band demultiplexer 4 and the band multiplexer 12.

A further cause of variance in the optical power spectrum or a WDM signal is the action of a photonic switch such as that shown in FIG. 1. Specifically, because the a connection map of the photonic switch is arbitrary, being driven by traffic connectivity considerations rather than optical link considerations. Thus, a particular output WDM signal emerging from the photonic switch will contain optical carriers that will likely have traveled along entirely different paths through the network. Each of these paths is associated with its own loss characteristics and therefore the various individual optical carrier optical signals that make up a WDM signal at the output of the photonic switch will have respective optical power level which are uncorrelated with one another.

The situation is illustrated in FIG. 3, where a 3×3 photonic switch 300 is connected to three input optical fibers 40, 42, 44 and three output optical fibers 60, 62, 64. The input optical power spectrum of the WDM signal on each of the input optical fibers 40, 42, 44 is shown at 50, 52, 54, respectively. Each of these three input optical power spectra 50, 52, 54 occupies the same optical frequency range but has a distinct shape. In particular, the shape of each of the optical power spectra 50, 52, 54 displays a certain degree of correlation among the power levels of neighbouring carriers. For example, spectrum 50 has a monotonically decreasing shape, spectrum 52 has a bell shape and spectrum 54 is composed of relatively constant power levels.

Since any arbitrary connection map may be provided by the photonic switch 300 at a given instant in time, the correlations existing among the carrier power levels on a the input optical fibers 40, 42, 44 may not carry through to the output optical fibers 60, 62, 64. Hence, the output optical 2 spectra (shown at 70, 72, 74) will exhibit a poor correlation among individual carriers and will appear "randomized". This effect may be compounded by differing losses experienced by the various signals as they transit the switch node components. Clearly, as a result of this lack of correlation among individual carriers, a band equalization technique such as that previously described with reference to FIG. 2 would be of little use if applied at the output or even at the input of the photonic switch 300.

Those skilled in the art will also appreciate that in addition to being affected by spectral variations arising from the arbitrary connection map applied by a photonic switch, the optical power spectrum of an output WDM signal may be further distorted by wavelength-dependent losses induced by a WDM device positioned at the output of the switch and, to a certain extent, by path-dependent losses through the photonic switch core.

Hence, it will be appreciated that the optical power spectrum of the WDM signals exiting a photonic switch can be severely distorted and, worse still, the distortion has no predictable spectral shape. Moreover, the optical power spectrum of the WDM signals can change dramatically and suddenly with each change in the connection map. Clearly, such wavelength-dependent distortion presents a serious limitation on the reach between the photonic switch and the next regeneration point in the network and therefore it would be a tremendous advantage to provide spectral flattening at the photonic switch, without adding significant complexity to the design of the photonic switch itself.

SUMMARY OF THE INVENTION

The present invention is directed to providing each signal at the output of a photonic switch with a controllable (e.g., flat) optical power spectrum, while only slightly increasing the complexity of the switch design. The equalization system, or "equalizer", of the present invention controllably adjusts the optical power of each individual optical signal passing through the photonic switch by placing a plurality of variable optical intensity controllers (VOICs) in each optical path prior to wavelength recombination. The VOICs can be variable optical amplifiers or variable optical attenuators. The VOICs are controlled by a controller which derives power estimates from individual optical carrier signals extracted from the WDM signals at the output of the photonic switch.

In this way, many advantages are achieved. Firstly, individual and independent control of the power on each optical channel is provided. Secondly, wavelength-dependent losses introduced by all the devices in the switch including the WDM devices at the output of the switch are accounted for. Thirdly, tapping the output WDM signals requires only one optical coupler for each output optical fiber, reducing the complexity of the equalization system. Fourthly, tapping the output WDM signals at the output of the switch has no effect on the system's noise floor.

In some embodiments of the invention, coarse equalization is provided for each multiplexed optical signal either at the input to the switch or at the output of the switch. This permits a reduction in the dynamic range over which the VOICs are required to operate, which advantageously allows the use of cheaper components.

In other embodiments of the invention, the controller in the equalizer will reduce the intensity of the individual optical signals that are effected by a forthcoming change in the connection map of the switch. The intensity is then gradually increased to a reference value once the new connection map is applied. This mapping procedure prevents existing carriers from being effected by sudden power level changes to other carriers sharing the same output optical fiber and optical amplifier chain.

In still other embodiments, the invention provides a calibration functionality. This can be achieved by evaluating the relative loss of each possible fiber/wavelength combination through the front end of the equalizer. In this way, spectral variations due to tolerances in the equalizer can be significantly reduced.

In a broad sense, the invention may be summarized as an optical intensity control system for use with an optical switch providing individual signal paths between a plurality of input ports and a plurality of output ports. The switch typically has a plurality of wavelength division multiplexers for combining sets of individual switched optical signals into multiplexed switched optical signals.

The intensity control system of the invention is equipped with a plurality of optical splitters, each being connectable to an output of a respective one of the wavelength division multiplexers and a plurality of variable optical intensity controllers (VOICs) for insertion into respective ones of the individual signal paths and for individually controlling the intensity of optical signals present in the respective ones of the individual signal paths in accordance with respective intensity control signals.

The intensity control system of the invention is further equipped with an equalizer connected to the splitters and to the VOICs, for producing an estimate of the optical power of each individual switched optical signal and generating the intensity control signals as a function of the estimates of optical power. This allows the optical powers of each of the carriers to be changed, resulting in a substantially equal power in each optical carrier.

The equalizer may have a front end circuit with a plurality of inputs for receiving the multiplexed switched optical signals, where the front end circuit is adapted to controllably isolate individual switched optical signals from the multiplexed switched optical signals. The equalizer also has an optical receiver unit connected to the front end circuit, for converting any isolated individual switched optical signals to electrical signals. The equalizer is further equipped with a power estimation unit connected to the optical receiver unit, for time-averaging the electrical signals, thereby to obtain respective estimates of optical power. Finally, the equalizer has a processor connected to the power estimation unit and to the front end circuit, where the processor is adapted to cause the front end circuit to isolate selected individual switched optical signals and also to generate the intensity control signals from the estimates of optical power.

In some embodiments, front end circuit has wavelength-tunable optical bandpass filters connected to outputs of the optical splitters. The processor is then adapted to selectably tune the filters in order to cause individual switched optical signals to be selected on the basis of fiber origin and individual wavelength.

In other embodiments, the front end circuit is equipped with an optical switch matrix having a plurality of inputs respectively connected to the plurality of splitters and having a plurality of controllably erectable mirrors, as well as a wavelength division demultiplexer connected to an output of the switch matrix. In this case, the processor is adapted to selectably raise one mirror at a time on the optical switch matrix in order to cause selected individual switched optical signals to be isolated.

The front end circuit may alternatively comprise a first optical switch matrix having a plurality of inputs respectively connected to the plurality of splitters and having a plurality of controllably erectable mirrors, as well as a wavelength division demultiplexer connected to an output of the first switch matrix and at least one second optical switch matrix, where each second optical switch matrix has a plurality of inputs connected to the wavelength division demultiplexer and having a plurality of controllably erectable mirrors. The processor would then be adapted to selectably raise one mirror at a time on the first optical switch matrix and to raise one mirror at a time on the at least one second optical switch matrix in order to cause selected individual switched optical signals to be isolated.

In still other cases, the front end circuit has (1) a first optical switch matrix having a plurality of inputs respectively connected to the plurality of splitters and having a plurality of controllably erectable mirrors, (2) a wavelength division demultiplexer connected to an output of the first switch matrix, (3) at least one second optical switch matrix, each the second optical switch matrix having a plurality of inputs connected to the wavelength division demultiplexer and having a plurality of controllably erectable mirrors and (4) a coupler connected to an output of each second optical switch matrix.

The invention may also be broadly summarized as a method of generating control signals for adjusting the intensity of single-carrier optical signals travelling through an optical switch, wherein groups of individual switched optical signals are recombined into multiplexed switched optical signals at an output end of the switch. The method includes the steps of:
    (a) controllably isolating individual switched optical signals from the multiplexed switched optical signals;
    (b) estimating the power of the individual switched optical signals isolated at step (a); and
    (c) generating the control signals as a function of the power estimates obtained at step (b) and a reference value.

The invention can also be broadly summarized as a switch for optical signals, which has wavelength division demultiplexers, wavelength division multiplexers, optical splitters connected to the multiplexer output port of a respective one of the wavelength division multiplexers, a switching core connected between the wavelength division demultiplexers and the wavelength division multiplexers, a plurality of variable optical intensity controllers (VOICs) positioned in respective ones of the optical paths, and an equalizer as described above, connected to the couplers and to the VOICs.

The switching core may comprise a plurality of core optical switching matrices, each core optical switch matrix being associated with a distinct optical wavelength. The switching core may further comprise a wavelength-converting inter-matrix switch connected to the core optical switching matrices, for receiving optical signals from the core optical switching matrices, converting each received optical signal to electrical form and transmitting each converted signal at a changed wavelength to the core optical switch matrix associated with the changed wavelength.

If optical switch matrices are used in the equalizer, at least one such optical switch matrix can be in a stacked relationship with respect to one or more core optical switch matrices to improve compactness.

The invention may also be summarized broadly as a method of calibrating power estimates received at a processor connected to an optical carrier selection circuit in an intensity control loop. The method includes the steps of:
    obtaining a reference estimate of the optical power of a reference light source without the effect of the optical carrier selection circuit;
    controlling the optical carrier selection circuit in order to obtain an estimate of the optical power of the reference light source for each of a plurality of possible optical paths through the optical carrier selection circuit;
    generating a calibration factor for each path by evaluating a function of the difference between the corresponding received power estimate and the reference estimate; and
    adjusting subsequent power estimates for each path by the corresponding calibration factor.

BRIEF DESCRIPTION OF THE DRAWINGS

These and other aspects and features of the present invention will now become apparent to those of ordinary skill in the art upon review of the accompanying description of specific embodiments of the invention in conjunction with the following drawings, in which:

FIG. 11 is a table illustrating a comparative summary of the component requirements of the embodiments of FIGS. 5 through 9;

DETAILED DESCRIPTION OF THE PREFERRED EMBODIMENTS

Figure 1:
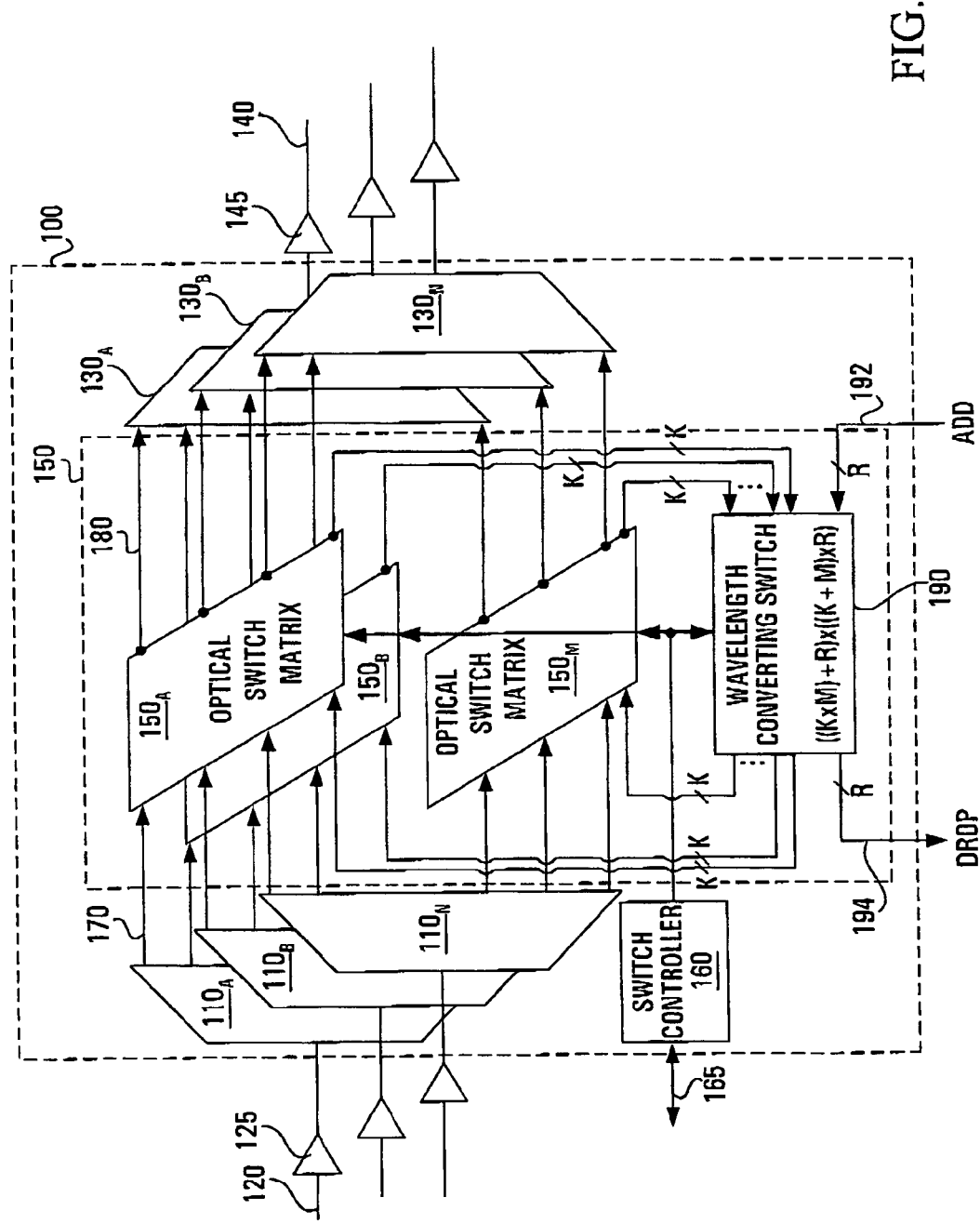
FIG. 1, already described, shows a photonic switch in block diagram form.
Figure 2:
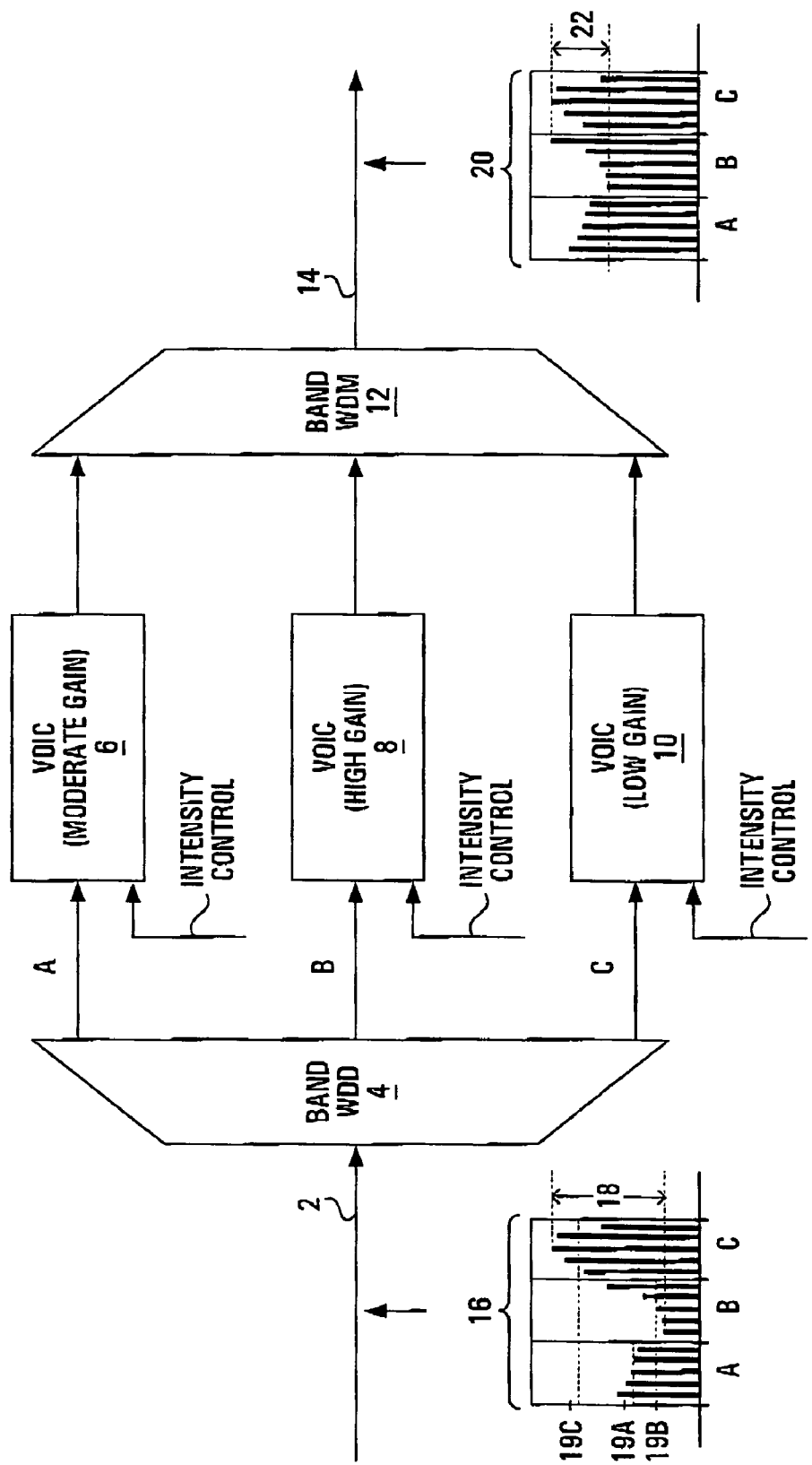
FIG. 2, already described, shows in block diagram form an implementation of a band equalization technique.
Figure 3:
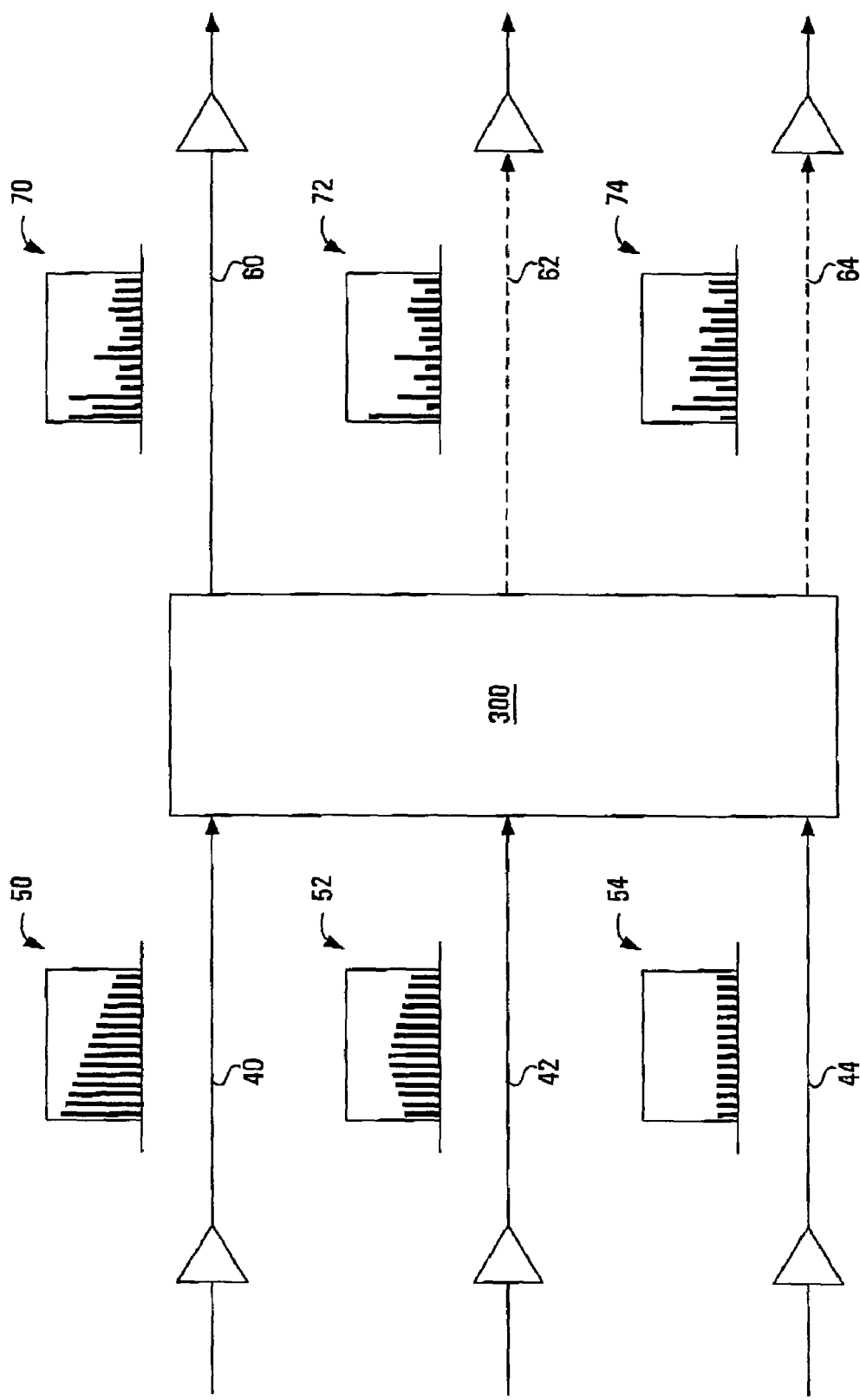
FIG. 3, already described, shows the effects of a photonic switch on the power spectrum of a WDM signal at the output of the photonic switch.
Figure 4:
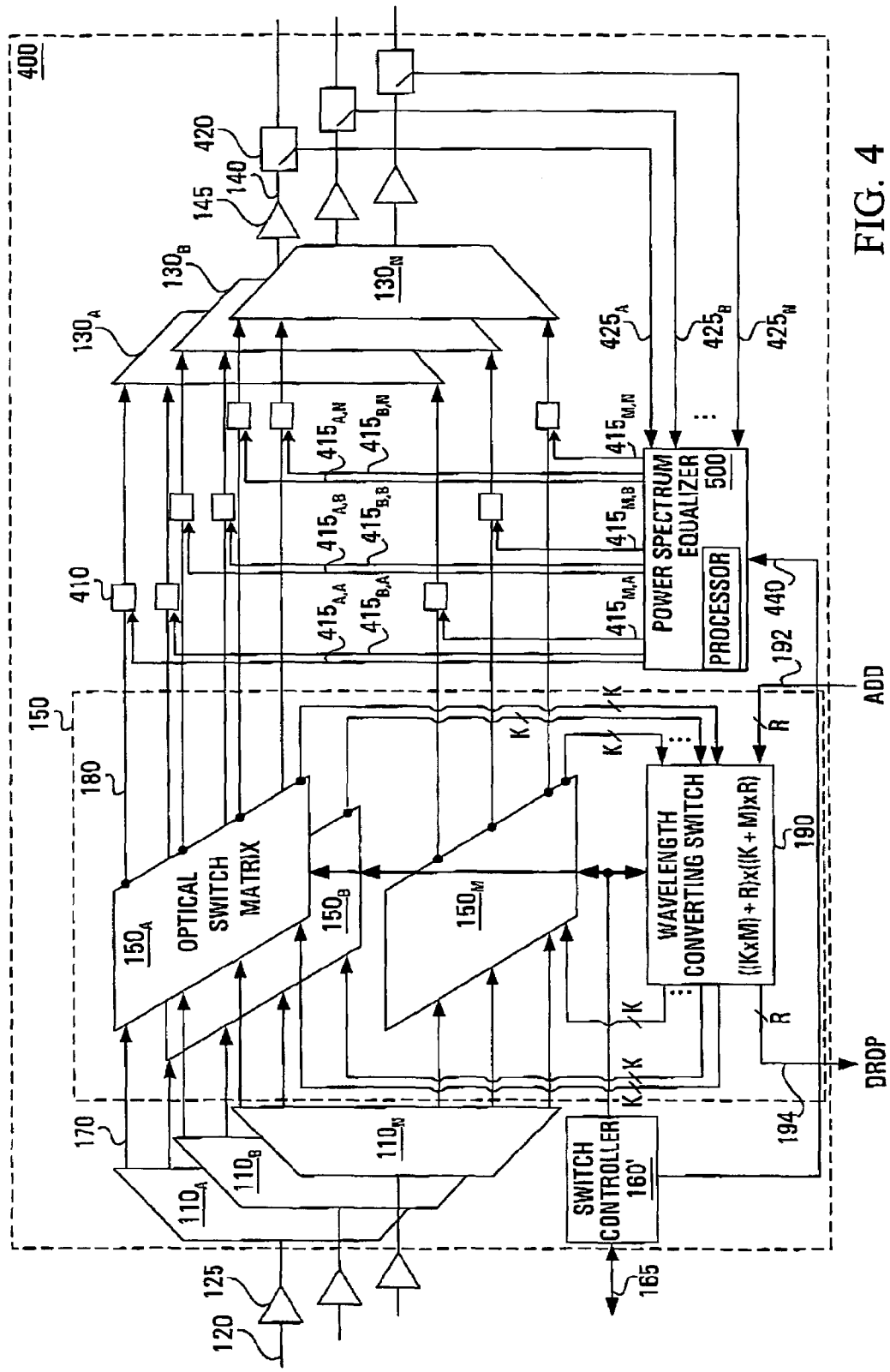
FIG. 4 shows in block diagram form part of a photonic switch in accordance with an embodiment of the present invention.

With reference to FIG. 4, there is shown a photonic switch 400 according to an embodiment of the present invention. The photonic switch 400 resembles the photonic switch 100 of FIG. 1 in that it retains the basic structure including the WDD devices $110_A$-$110_N$, the WDM devices $130_A$-$130_N$ and the photonic switch core 150.

The photonic switch 400 of the invention additionally comprises a plurality (M×N) of variable optical intensity controllers (VOICs) 410 respectively positioned in each of the demuxed switched optical paths 180. Thus, each of the VOICs 410 is associated with a respective switched individual optical carrier signal that emerges from the photonic switch core 150 along a respective one of the demuxed switched optical paths 180.

The VOICs 410 are used for providing intensity control in the form of either attenuation or amplification. Thus, each of the VOICs 410 can either be a variable optical attenuator or a variable optical amplifier, depending on the operational requirements of the invention. The range of intensity control (i.e., attenuation or gain) required of an individual VOIC is typically expected to be on the order of 8 decibels (dB) or less, although it is within the scope of the invention to provide a greater or smaller dynamic range of attenuation or gain.

It is convenient to view the VOICs 410 as forming an array of size M×N where, it is recalled, N is the number of WDM devices $130_A$-$130_N$ and M is the number of wavelengths handled by each WDM device (which is also the number of optical switch matrices $150_A$-$150_M$ in the photonic switch core 150). Typical values for M are 32 and above, while typical values for N are 4 and above. However, it should be understood that the invention is not subject to any 2 limitation on M or N.

Each of the VOICs 410 has a control port for receiving a respective intensity control signal along a respective one of a plurality of intensity control lines generally indicated by the reference numeral 415. Each such intensity control line carries an intensity control signal indicative of a desired amount of attenuation or gain to be applied by the respective VOIC. The intensity control line leading to the VOIC corresponding to the $J^{th}$ optical switch matrix $150_J$ and the $K^{th}$ WDM device $130_K$ can be denoted $415_{J,K}$, where J∈{A, B, . . . , M} and K∈{A, B, . . . , N}.

With continued reference to FIG. 4, the photonic switch 400 of the invention further comprises a plurality (N) of directional couplers 420 (also referred to as optical splitters), each of which intercepts the optical path of a respective one of the N output optical fibers 140. It is noted that the number of couplers 420 is equal to the number of output optical fibers 140, which is M times less than the total number of demuxed switched optical paths 180.

It should be understood that the couplers (splitters) 420 could be placed after the amplifiers 145 (as shown) or in front of the amplifiers 145, depending on the operational requirements of the invention. For instance, if it is important to allow openness so that $3^{rd}$ party amplifiers 145 can be used, then it is desirable to place the couplers 420 in front of the amplifiers 145. However, such a configuration would not permit the power spectrum equalizer 500 to compensate for spectral gain variations introduced by the amplifiers 145. Therefore, to compensate for such variations, it would be advantageous to place the couplers 420 after the amplifiers 145.

Each of the N couplers 420 can be a standard component which is designed to tap a small, known amount of optical power from the respective output optical fiber 140. A suitable amount of optical power tapped in this manner will be 10 dB to 13 dB below the optical power level on the respective output optical fiber 140. This lowers the optical power level of the ongoing signal by only 0.22 dB to 0.46 dB, which loss can then be compensated for by increasing the gain of the respective amplifier (when the couplers 420 are placed in front of the amplifiers 145) or by increasing the gain (decreasing the attenuation) of the VOICs 410 associated with that amplifier.

The photonic switch 400 of the present invention further comprises a power spectrum equalization control system (hereinafter simply referred to as an "equalizer") 500 which is placed between the couplers 420 and the VOICs 410 and which communicates with a switch controller 160' via a control line 440. The switch controller 160' is similar to the switch controller 160 in FIG. 1 with additional special operational features that will be described later on. As with the switch controller 160 of FIG. 1, the switch controller 160' of FIG. 4 communicates with the outside world by a control link 165.

The equalizer 500 is connected to each of the N couplers 420 by a respective one of a plurality of optical paths $425_A$-$425_N$, where optical path $425_A$ carries a tapped WDM optical signal from WDM device $130_A$, optical path 425B carries a tapped WDM optical signal from WDM device $130_B$, and so on. The equalizer 500 is further connected to the control port of each of the M×N VOICs 410 by a respective one of the plurality of intensity control lines 415.

The equalizer 500 may have a variety of internal configurations, some of which will be described in further detail later on. A feature common to each structure is the provision of suitable circuitry, software and/or control logic for:
receiving tapped optical signals from the couplers 420 along the optical paths $425_A$-$425_N$;
processing the tapped optical signals according to an algorithm (still to be described); and
generating intensity control signals to be supplied to the M×N individual VOICs 410 via the M×N intensity control lines 415.

Thus, the equalizer 500 controls the amount of gain or attenuation to be applied by each of the VOICs 410. This is done with the aim of flattening the optical power spectrum of each output WDM signal.

Figure 5:
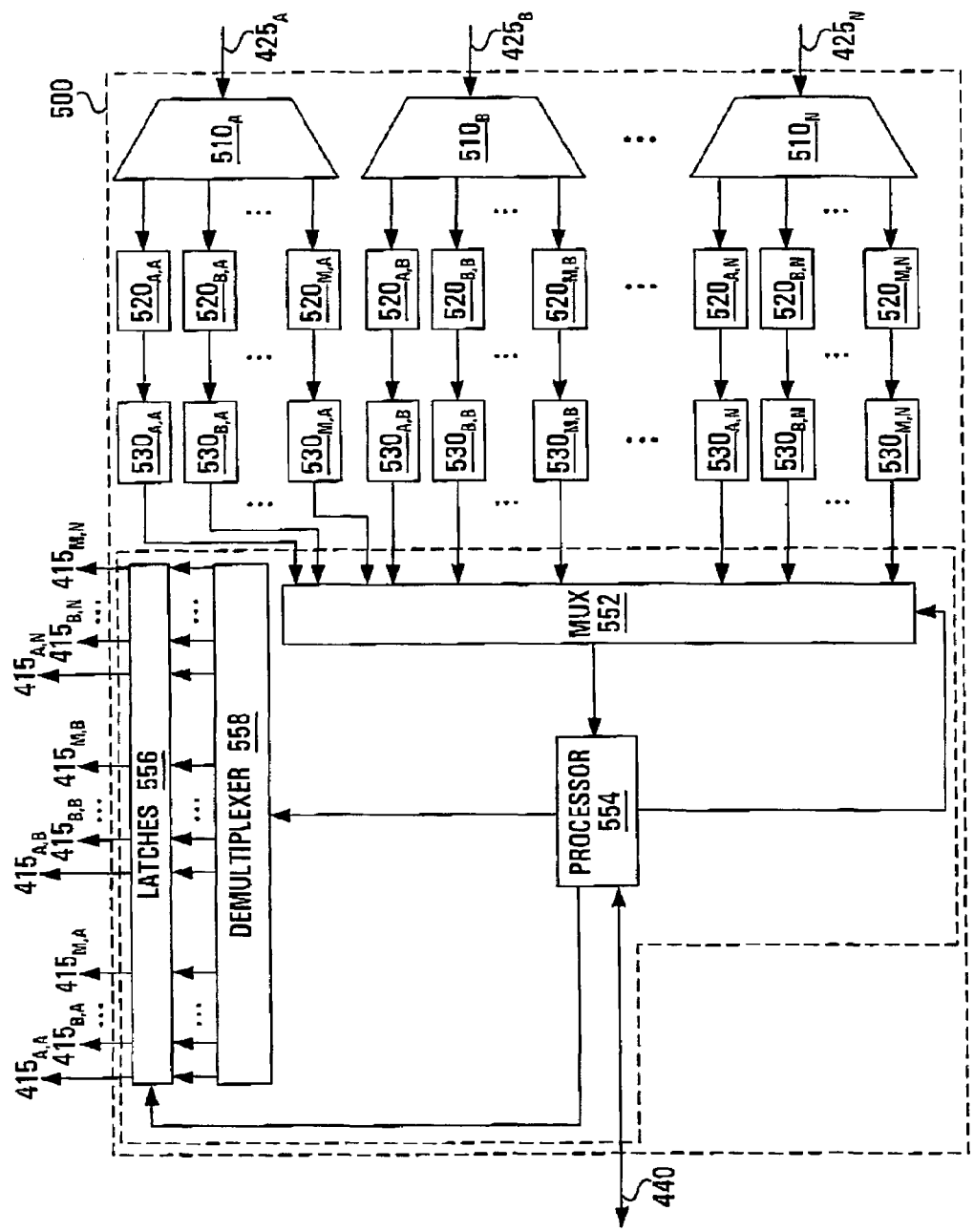
FIGS. 5 through 9 show, in block diagram form, specific embodiments of an equalizer forming part of the photonic switch of FIG. 4.

Specific embodiments of the equalizer 500 are now described with reference to FIGS. 5, 6, 7, 8 and 9. In FIG. 5, the equalizer 500 is seen to comprise N individual M-output WDD devices $510_A$-$510_N$, each of which is connected to a respective one of the couplers 420 via a respective one of the optical paths $425_A$-$425_N$. Each of the WDD devices $510_A$-$510_N$ is designed to separate the received, coupled version of the respective output WDM signal into its M individual 2 optical carrier components. Therefore, the M signals at the output of each of the WDD devices $510_A$-$510_N$ correspond to the M switched individual optical carrier signals as combined by the respective one of the WDM devices $130_A$-$130_N$.

Each of the WDD devices $510_A$-$510_N$ is connected to a respective set of M optical receivers. For notational convenience, the particular optical receiver associated with the switched individual optical carrier signal carried along one of the demuxed switched optical paths 180 from the $J^{th}$ optical switch matrix $150_J$ to the $K^{th}$ WDM device $130_K$ can be denoted $520_{J,K}$. Thus, in FIG. 5, WDD device $510_A$ is connected to optical receivers $520_{A,A}$, $520_{B,A}$, . . . $520_{M,A}$, WDD device $510_B$ is connected to optical receivers $520_{A,B}$, $520_{B,B}$, . . . $520_{M,B}$, etc., and WDD device $510_N$ is connected to optical receivers $520_{A,N}$, $520_{B,N}$, . . . $520_{M,N}$.

The optical receivers (collectively denoted by 520) each comprise circuitry such as a photodiode and a trans-impedance amplifier for converting into electrical form an optical signal present at its input. In the embodiment of FIG. 5, the signal received at the input to a given optical receiver is always at the same wavelength, and therefore each of the optical receivers 520 can be a narrow-optical-bandwidth component tuned to the appropriate optical wavelength.

The M×N optical receivers 520 are respectively connected to a plurality (M×N) of power estimation modules. The individual power estimation module connected to optical receiver $520_{J,K}$ for a particular value of J and K can be denoted by $530_{J,K}$. Thus, the power estimation module denoted by $530_{A,A}$ is connected to optical receiver $520_{A,A}$, and so on.

Each of the power estimation modules (collectively denoted by 530) comprises circuitry, firmware or control logic for estimating the power of the optical signal from which the electrical signal received from the respective one of the optical receivers 520 was derived. Since optical power is directly proportional to optical intensity, suitable power estimation circuitry could include circuitry for measuring the average voltage of the received electrical signal, from which the optical power can be determined. Of course, those skilled in the art will be familiar with other methods of power estimation. Furthermore, sampling and digitizing operations can be performed either prior or subsequent to power estimation.

It will also be appreciated that as long as the digital signal on each optical wavelength has a duty cycle of approximately 50% (i.e., has an approximately equal number of zeroes and ones over a pre-determined integration interval), the receivers 520 and power estimation modules 530 can be low-speed components for measuring average power over such an integration interval.

With continued reference to FIG. 5, the power estimate produced by each of the power estimation modules 530 is provided to a respective input of a controller 550. In the embodiment of FIG. 5, the controller 550 is equipped with a M×N-input multiplexer 552 which is connected to a processor 554. The processor 554 selectively reads the power estimates through control of the multiplexer 552 via a control line.

The processor 554 comprises suitable circuitry, software and/or control logic for processing the power estimates received from the power estimation modules 530 and generating intensity control signals for transmittal to the VOICs 410 along the intensity control lines 415. Operation of the processor 554 in accordance with an equalization algorithm will be described in further detail later on.

As shown in FIG. 5, the processor 554 may be connected to the VOICs by a plurality (M×N) of latches 556 and an intervening demultiplexer 558. Thus, the processor 554 may provide the intensity control signals one at a time to the demultiplexer 558 along a single signal line. Under control of the processor 554, the demultiplexer 558 then sends the received intensity control signal to the appropriate one of the latches 556, where the present value of the intensity control signal is held until further notice.

Figure 6:
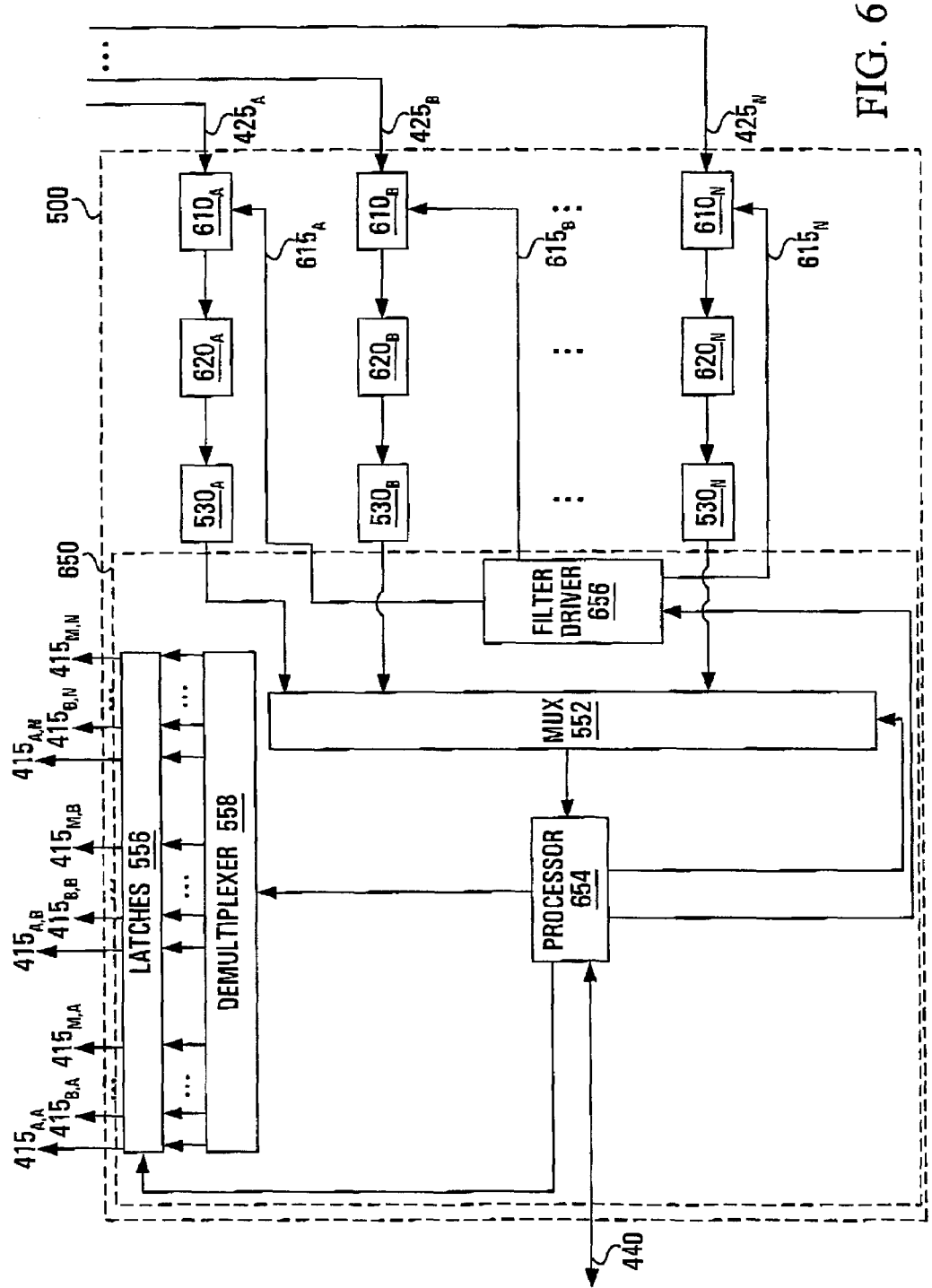

Another specific embodiment of the equalizer 500 is shown in FIG. 6. In this case, the equalizer 500 comprises a plurality of wavelength-tunable optical bandpass filters $610_A$-$610_N$, each of which is connected to a respective one of the couplers 420 via a respective one of the optical paths $425_A$-$425_N$. A wavelength-tunable optical bandpass filter is a known component which passes a selectable optical frequency range of an input signal as a function of a control voltage or current supplied to the filter. Thus the need for WDD devices at the input to the equalizer 500 can be avoided, while reducing the total required number of optical receivers and power estimation modules.

Specifically, the output of each of the wavelength-tunable optical bandpass filters $610_A$-$610_N$ is connected to a respective one of a plurality of optical receivers $620_A$-$620_N$, each of which is similar to one of the optical receivers 520 previously described with reference to FIG. 5. However, because the signal input to any one of the N optical receivers $620_A$-$620_N$ may occupy any one of the M possible wavelengths in the system, the optical receivers $620_A$-$620_N$ must each be operable over a wider optical bandwidth, typically the entire WDM spectrum.

Each of the optical receivers $620_A$-$620_N$ has an output which is connected to a respective one of a plurality of power estimation modules $530_A$-$530_N$, each of which is identical to any of the power estimation modules suitable for use in the equalizer of FIG. 5. The power estimation modules $530_A$-$530_N$ are connected to respective inputs of a controller 650. In the embodiment of FIG. 6, the controller 650 is equipped with an N-input multiplexer 652 which is connected to a processor 654. The processor 654 selectively reads the power estimates through control of the multiplexer 652 via a control line.

The processor 654 comprises suitable circuitry, software and/or control logic for processing the power estimates received from the power estimation modules 630 and generating intensity control signals for transmittal to the VOICs 410 along the intensity control lines 415. In addition, the controller 650 comprises a filter driver 656 for varying, under control of the processor 654, the pass band of the wavelength-tunable optical bandpass filters $610_A$-$610_N$ via a respective plurality of control lines $615_A$-$615_N$. Operation of the processor 654 in accordance with an equalization algorithm will be described in further detail later on.

The processor 654 may be connected to the VOICs by a plurality (M×N) of latches 556 and an intervening demultiplexer 558. Thus, the processor 654 provides the intensity control signals one at a time to the demultiplexer 558 along a single signal line. Under control of the processor 654, the demultiplexer 558 then sends the received intensity control signal to the appropriate one of the latches 556, where the present value of the intensity control signal is held until further notice.

Figure 7:
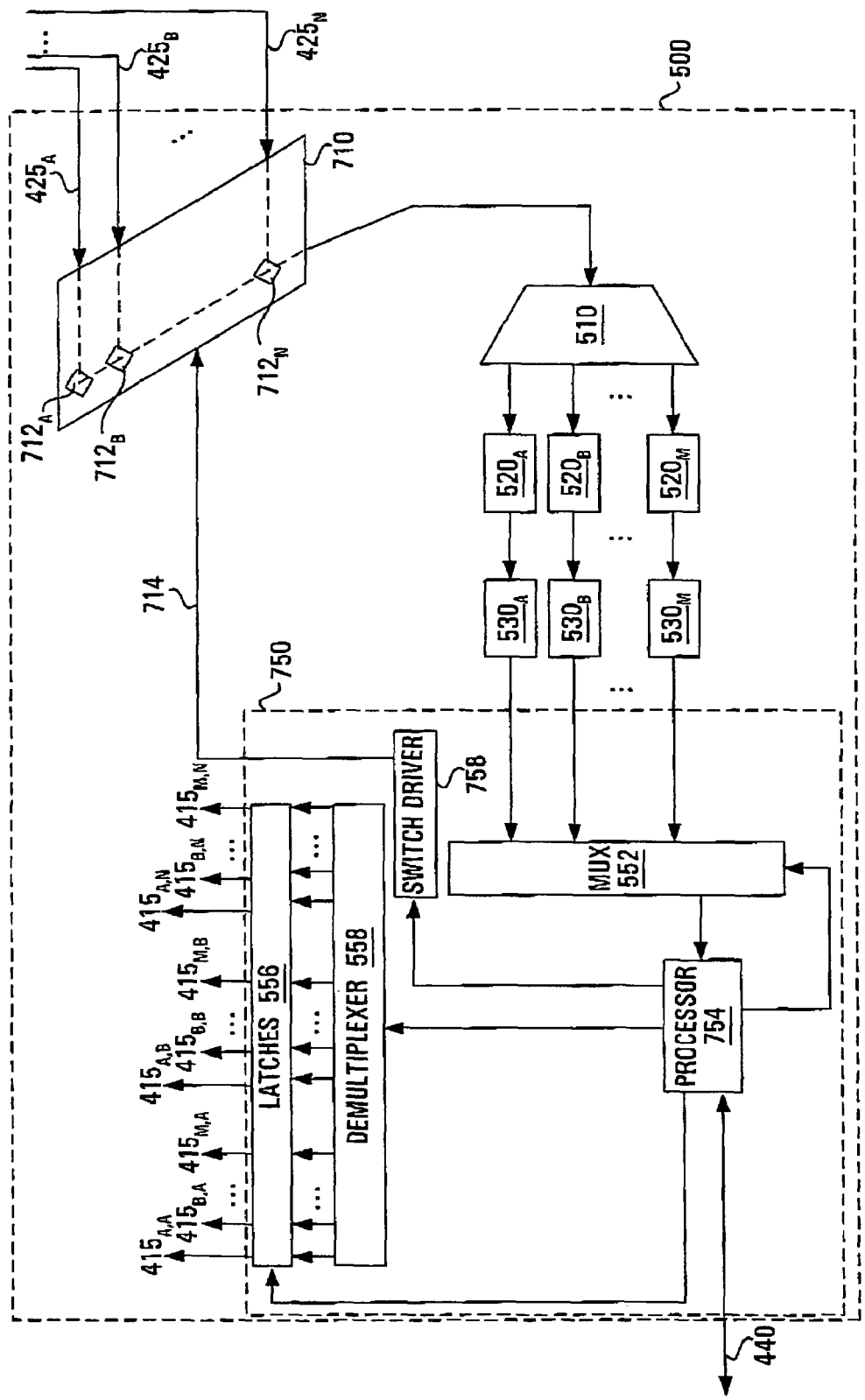

Another specific embodiment of the equalizer 500 is shown in FIG. 7, wherein the optical paths $425_A$-$425_N$ lead to respective inputs of an N-input optical switch matrix 710 (e.g., a MEMS based optical switch matrix as described in the previously referenced article by Lih Y. Lin of AT&T Labs-Research) which can be identical to any one of the switch matrices $150_A$-$150_M$ in FIG. 4. In this case, only one of the output ports of the optical switch matrix 710 is used and this particular output port is connected to an M-output WDD device 510. However, it is possible to decrease response and scanning times by using more than one output of the optical switch matrix 710, with each such output being connected to its own WDD device.

Within the optical switch matrix 710 there is provided an arrangement of N controllably erectable mirrors $712_A$-$712_N$. The position of each mirror is either flat (in the plane of the optical switch matrix 710) or upright (perpendicular to the plane of the optical switch matrix 710), depending on the value of a control signal 714. When a particular one of the mirrors $712_A$-$712_N$, say the $p^{th}$ mirror $712_p$, is selected to be upright, then light arriving along the corresponding optical path $425_p$ from the corresponding one of the couplers 420 will be directed to the output of the optical switch matrix 710 and into the WDD device 510.

The WDD device 510 is identical to the WDD devices $510_A$-$510_N$ of FIG. 5 and thus is designed to separate the received optical signal (arriving from the optical switch matrix 710) into its M component wavelengths. The signals output by the WDD device 510 arrive at respective ones of a plurality of optical receivers $520_A$-$520_M$.

Since each of the optical receivers $520_A$-$520_M$ is dedicated to processing signals having a fixed wavelength, each of the optical receivers $520_A$-$520_M$ can have a narrower optical bandwidth than the receivers $620_A$-$620_N$ in FIG. 6.

Thus, each of the optical receivers $520_A$-$520_M$ can be identical to any of the optical receivers suitable for use in the equalizer of FIG. 5 and is accordingly designated by the same reference character. The number of such optical receivers in the embodiment of FIG. 7 is equal to the number of wavelengths (which is M).

Each of the optical receivers $520_A$-$520_M$ is connected to a respective one of a plurality of power estimation modules $530_A$-$530_M$, each of which can be identical to any of the power estimation modules suitable for use in the embodiments of FIGS. 5 and 6. The number of power estimation modules 530 in the embodiment of FIG. 7 is equal to the number of wavelengths (M). The power estimation modules $530_A$-$530_M$ are connected to respective inputs of a controller 750. In the embodiment of FIG. 7, the controller 750 is equipped with an M-input multiplexer 752 which is connected to a processor 754. The processor 754 selectively reads the power estimates through control of the multiplexer 752 via a control line.

The processor 754 comprises suitable circuitry, software and/or control logic for processing the power estimates received from the power estimation modules $530_A$-$530_M$ and generating intensity control signals for transmittal to the VOICs 410 along the intensity control lines 415. In addition, the controller 750 comprises a switch driver 758 for raising, under control of the processor 754, a selected one of the mirrors $712_A$-$712_N$ in the optical switch matrix 710. Operation of the processor 754 in accordance with an equalization algorithm will be described in further detail later on.

As was described earlier with reference to FIGS. 5 and 6, the processor 754 may be connected to a plurality (M×N) of latches 556 by a demultiplexer 558. Thus, the processor 754 provides the intensity control signals one at a time to the demultiplexer 558 along a single signal line. Under control of the processor 754, the demultiplexer 558 then sends the received intensity control signal to the appropriate one of the latches 556, where the present value of the intensity control signal is held for the respective VOIC until further notice.

Figure 8:
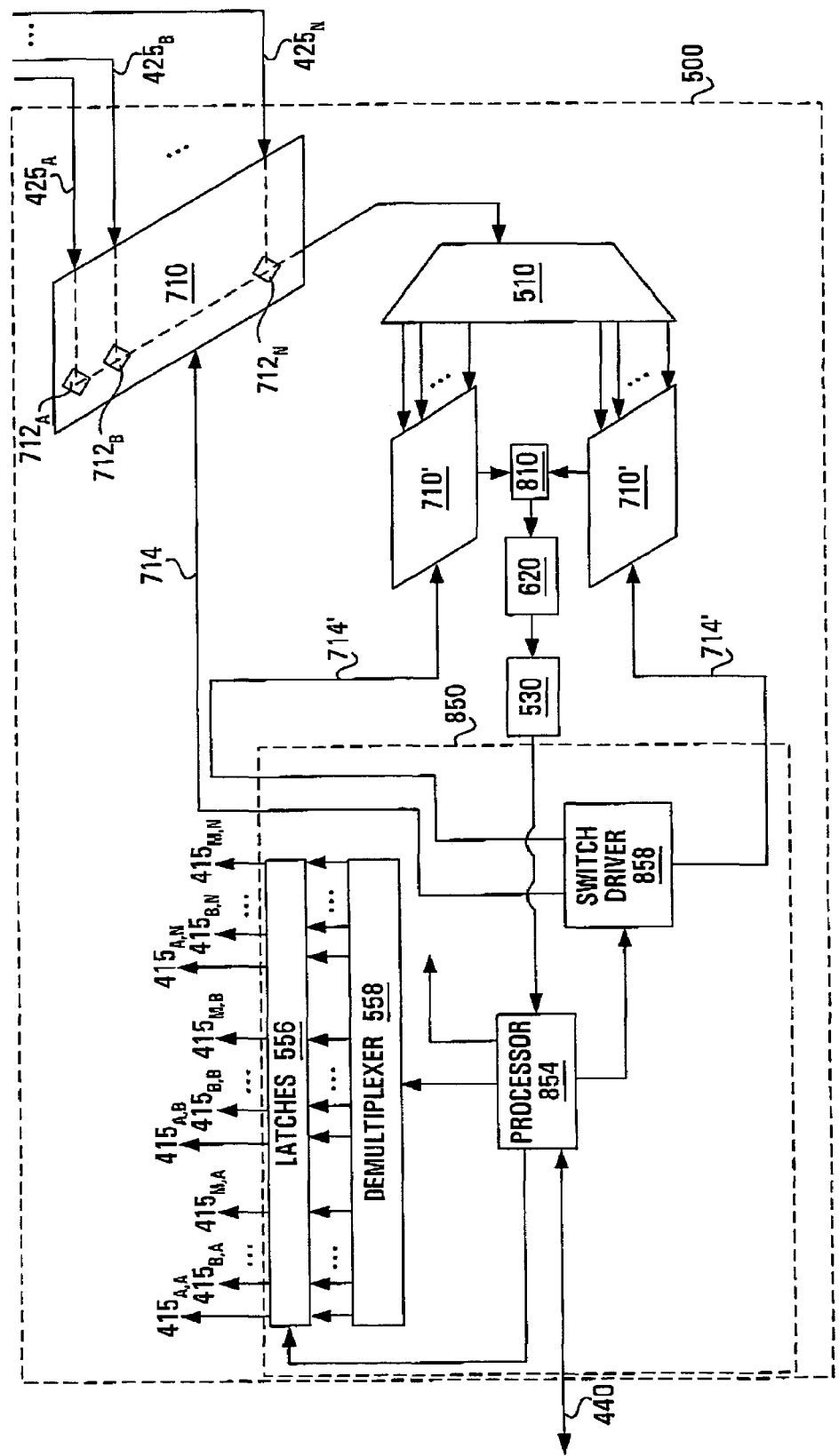

In FIG. 8 is shown yet another embodiment of the equalizer 500 of the present invention, representing an elegant simplification in the design. In this embodiment, there is provided a first N-input optical switch matrix 710 (identical to that of FIG. 7) which is connected to a WDD 2 device 510 (identical to those of FIGS. 5 and 7), The elevation of a particular mirror in the optical switch matrix 710 is controlled by a control signal received along a control line 714. The output of the optical switch matrix 710 contains a multi-wavelength optical signal which is split into its M optical carrier components by the WDD device 510.

The WDD device 510 is connected to one or more additional N-input optical switch matrices 710'. Each of the optical switch matrices 710' consists of an arrangement of controllably erectable mirrors whose position is either flat or upright as controlled by another control signal received along another control line 714'. Thus, only one output of each of the optical switch matrices 710' is actually used.

Of course, in order to use only one N-input optical switch matrix 710', then N (the number of input or output optical fibers) should be greater than or equal to M (the number of wavelengths in the system). Since in many cases this condition cannot be satisfied, it becomes necessary to provide a number of optical switch, matrices 710' equal to ceil (M÷N), where ceil (M÷N) represents the smallest integer value not less than the quotient of M and N.

The case where ceil (M+N)=2 is shown in FIG. 8, there being provided two optical switch matrices 710' with the output of each optical switch matrix being coupled together at a coupler 810. Alternatively, the coupler 810 can be omitted and the output of each of the switch matrices 710' can be provided to a controller 850 via separate paths. In either case, by ensuring that only one of the mirrors on only one of the optical switch matrices 710' is upright at any one time, the multiple optical switch matrices 710' can be made to behave as a single M-input optical switch matrix.

An advantage of using multiple N-input optical switch matrices 710' rather than one M-input optical switch matrix is that N-input optical switch matrices 710' have the exact same dimensions as the optical switch matrices $150_A$-$150_M$ in the photonic switch core 150 and can be fully integrated therewith. Thus, the optical switch matrices 710, 710' can be stacked or aligned with respect to the optical switch matrices $150_A$-$150_M$ in the photonic switch core 150, thereby improving compactness of the switch as a whole.

The output of the coupler 810 is connected to the optical receiver 620 which can be identical to any of the optical receivers previously described with reference to FIG. 6., i.e., the optical receiver 620 must have a sufficiently wide optical bandwidth of operation to handle optical carrier signals occupying different wavelengths at different times. If the coupler 810 is dispensed with, then the output of each of the optical switch matrices 710' could be connected to its own wide-optical-bandwidth optical receiver.

The optical receiver 620 is connected to a power estimation module 530, which can be identical to any of the power estimation modules suitable for use in the embodiments of FIGS. 5, 6 and 7. If the coupler 810 is omitted from the design, then the number of optical receivers and power estimation modules would equal the number of optical switch matrices 710', which is equal to ceil(M÷N).

The power estimation module 530 is connected to an input of a processor 854 in the controller 850. The processor 854 comprises suitable circuitry, software and/or control logic for processing power estimates received from the power estimation module 530 and generating intensity control signals for transmittal to the VOICs 410 along the intensity control lines 415. Moreover, the controller 850 comprises a switch driver 858 for raising, under control of the processor 854, exactly one of the mirrors $712_A$-$712_N$ in the optical switch matrix 710 and exactly one of the mirrors from among all those in the one or more optical switch matrices 710' connected to the WDD device 510. This allows the processor 854 to sequentially access the individual power estimates associated with various wavelength-fiber combinations. Operation of the processor 854 in accordance with an equalization algorithm will be described in further detail later on.

As was described previously with reference to FIGS. 5 through 7, the processor 854 may be connected to a plurality (M×N) of latches 556 by a demultiplexer 558. Thus, the processor 854 provides the intensity control signals one at a time to the demultiplexer 558 along a single signal line. Under control of the processor 854, the demultiplexer 558 then sends the received intensity control signal to the appropriate one of the latches 556, where the present value of the intensity control signal is held until further notice.

Figure 9:
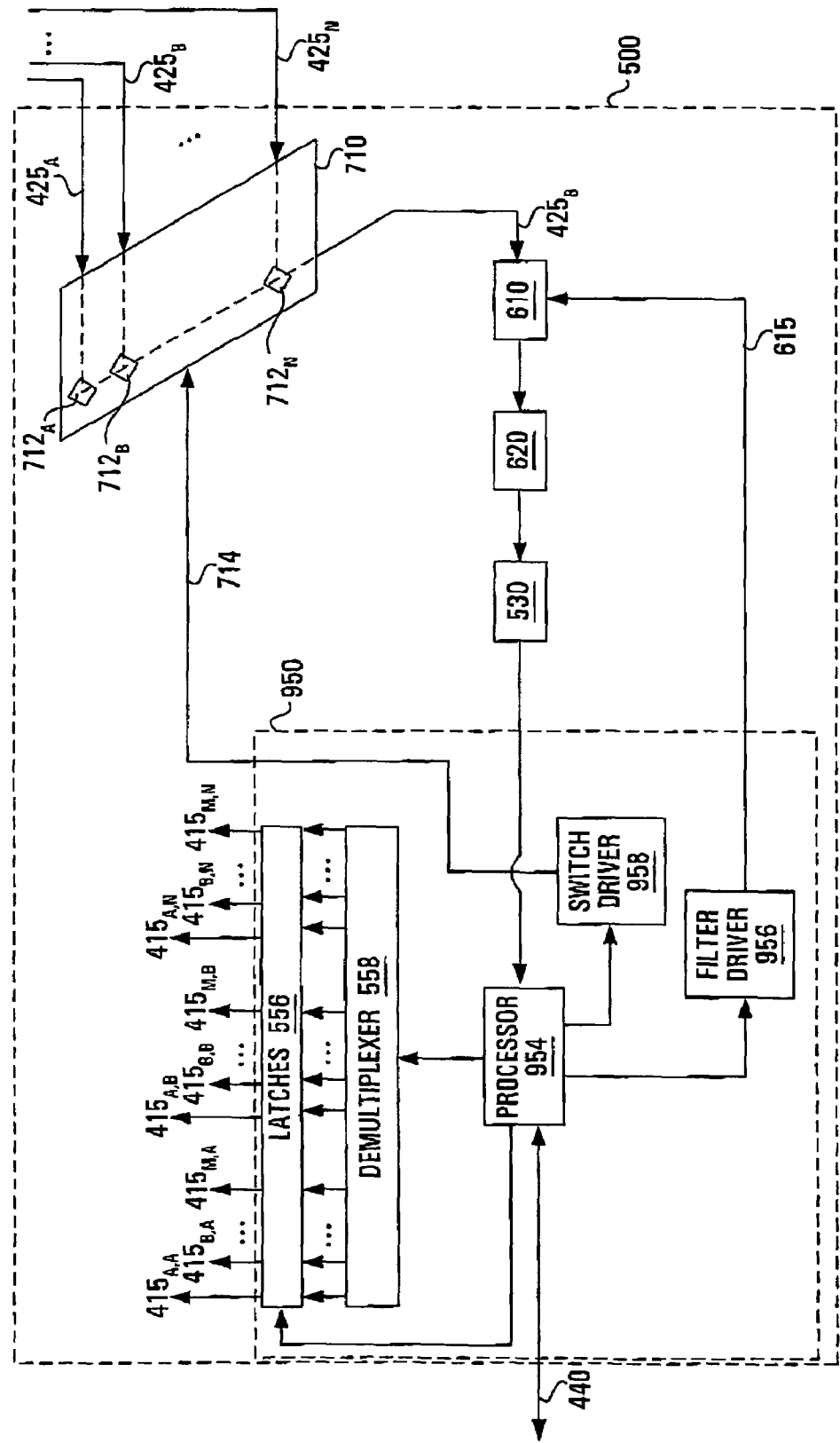

Still another embodiment of the equalizer 500 is depicted in FIG. 9, wherein there is provided an N-input optical switch matrix 710 much like any of the previously described optical switch matrices suitable for use in the embodiments of FIGS. 7 and 8. The selection of which of the mirrors $712_A$-$712_N$ is to be raised is controlled via a control link 714. An output of the optical switch matrix 710 is connected to a single wavelength-tunable optical bandpass filter 610 much like any of the filters $610_A$-$610_N$ suitable for use with the embodiment of FIG. 6. Again, the use of more than one output of the optical switch matrix 710 may reduce the response and scanning time associated with measuring the power of the switched individual optical carrier signals travelling through the photonic switch 400. The output of the wavelength-tunable optical bandpass filter 610 is connected to a processor 954 within a controller 950 via a wide-optical-bandwidth optical receiver 620 and a power estimation module 530. The processor 954 is equipped with suitable circuitry, software and/or control logic for processing power estimates received from the power estimation module 530 and generating intensity control signals for transmittal to the VOICs 410 along the intensity control lines 415.

Moreover, the controller 950 comprises a switch driver 958 for raising, under control of the processor 954, exactly one of the mirrors $712_A$-$712_N$ in the optical switch matrix 710. In addition, the controller 950 comprises a filter driver 956 for varying, under control of the processor 954, the pass band of the wavelength-tunable optical bandpass filter 610 via a control link 615. This allows the processor 954 to sequentially access the individual power estimates associated with various wavelength-fiber combinations. Operation of the processor 954 in accordance with an equalization algorithm will be described in further detail later on.

As was described previously with reference to FIGS. 5 through 8, the processor 954 may be connected to a plurality (M×N) of latches 556 by a demultiplexer 558. Thus, the processor 954 provides the intensity control signals one at a time to the demultiplexer 558 along a single signal line. Under control of the processor 954, the demultiplexer 558 then sends the received intensity control signal to the appropriate one of the latches 556, where the present value of the intensity control signal is held until further notice.

FIG. 11 provides, in tabular form, a comparative summary of the various embodiments of the controller in FIGS. 5 through 9 in terms of the number of components (optical receivers, power estimation modules, optical switch matrices, WDD devices, wavelength-tunable optical bandpass filters) required in order to implement each embodiment. It is seen that the progression of embodiments from FIG. 5 through to FIG. 9 is increasingly intricate yet elegant. The utmost in simplicity and elegance is achieved in the embodiment of FIG. 9 where the equalizer 500 requires only one power estimation module 530, one wavelength-tunable optical bandpass filter 610, one wide-optical-bandwidth optical receiver 620 and one N-input switch matrix 710.

As has been previously described (with reference to FIG. 8, for example), the use of N-input optical switch matrices 710, 710' permits these switch matrices to be integrated into the structure of the photonic switch core 150. Thus, in designing a card cage for housing the optical switch matrices $150_A$-$150_M$ forming part of the optical switch core 150, it is within the scope of the invention to provision additional slots not only for use with spare optical switch matrix cards but also for use with the optical switch matrix cards 710, 710' needed by the equalizer (e.g., 1 spare card for the embodiments of FIGS. 7 and 9 and ceil (M÷N) spare cards for the embodiment of FIG. 8).

Operation of the "equalization processor" is now described. The term "equalization processor" is hereinafter used to refer to any of the processors 554, 654, 754, 854, 954 previously described with reference to FIGS. 5, 6, 7, 8, 9, respectively. In each case, the equalization processor runs an equalization algorithm for processing the power estimates received from the power estimation module(s) 530 and for interacting with the switch controller 160' via the control line 440.

The equalization algorithm has two modes of operation, the first mode being a so-called "scan mode", which is executed under steady-state connection conditions, and the second mode being a so-called "directed mode", which is entered upon interruption of the equalization controller while it is running in scan mode.

In scan mode, operation of the equalization controller basically consists of:
(1) cycling through all "valid" combinations of output optical fibers and wavelengths, and reading the power estimate associated with each such valid combination; and
(2) adjusting, as a function of the power estimates, the intensity control signals being fed to the VOICs.

A "valid" combination referred to in (1) above means that an optically carrier modulated data signal is expected to be found on that particular wavelength and on that particular output optical fiber.

Typically, at any given instant, many combinations of output optical fiber and wavelength will be valid but some will not, i.e., it is expected that one or more wavelengths on one or more output optical fibers may not contain an optical carrier modulated data signal. Whether or not a particular combination is valid depends on the connection map and thus will be known to the switch controller 160'. The switch controller 160' can therefore make available a list of valid combinations to the equalization processor. This list is then kept up to date in a manner to be described further on when discussing the "directed mode" of operation.

Having determined that a particular combination of wavelength and output optical fiber is indeed valid, the equalization processor, still in step (1) of scan mode, must read the power estimate corresponding to this combination. The manner in which this is achieved depends on the configuration of the controller as a whole. For example, let the equalization processor be required to access the power estimate associated with the $J^{th}$ wavelength on the $K^{th}$ output optical fiber.

In the embodiment of FIG. 5, the equalization processor 554 would obtain the desired power estimate by reading the output of power estimation module $530_{J,K}$, which is uniquely associated with the desired combination of wavelength and output optical fiber.

In the embodiment of FIG. 6, the equalization processor 654 sends a message to the filter driver 656, which then instructs the $K^{th}$ wavelength-tunable optical bandpass filter $610_K$ to pass light occupying the $J^{th}$ wavelength. The equalization processor 654 would then obtain the desired power estimate by reading the output of the $K^{th}$ power estimation module $530_K$.

In the embodiment of FIG. 7, the equalization processor 754 sends a message to the switch driver 758, which then instructs the optical switch matrix 710 to raise the $K^{th}$ mirror $712_K$. The equalization processor 754 would then obtain the desired power estimate by reading the output of the $J^{th}$ power estimation module $530_J$.

In the embodiment of FIG. 8 (with the coupler 810 in place), the equalization processor 854 sends a message to the switch driver 858, which then instructs the switch matrix 710 to raise only the $K^{th}$ mirror and also instructs the appropriate one of the optical switch matrices 710' to raise only the $J^{th}$ mirror. The equalization processor 854 would then obtain the desired power estimate by reading the output of the power estimation module 530.

Finally, in the embodiment of FIG. 9, the equalization processor 954 sends a first message to the switch driver 958, which then instructs optical switch matrix 110 to raise the $K^{th}$ mirror $712^K$. The equalization processor 954 also sends a second message to the filter driver 956, which instructs the wavelength-tunable optical bandpass filter 610 to pass light occupying the $J^{th}$ wavelength. The equalization processor 954 would then obtain the desired power estimate by reading the output of the power estimation module 530.

Now having regard to step (2) above, namely the adjustment of the intensity control signals being fed to the VOICs 410 as a function of the power estimates, the scan mode of operation provides for at least two ways of performing this step.

In a preferred version of step (2) in scan mode operation, the received power estimate associated with a valid combination (e.g., the $J^{th}$ wavelength on the $K^{th}$ output optical fiber) is immediately compared to a pre-determined reference value, and the resulting difference is encoded as an intensity control signal that is fed to the demultiplexer 558. The demultiplexer 558 is then controlled to send this intensity control signal to the appropriate one of the latches 556, which is then used to drive the appropriate VOIC via the appropriate intensity control line 415$_{J,K}$.

This procedure is repeated for each valid combination of wavelength and output optical fiber. After a finite time, the output power level of each carrier on each output optical fiber will converge to the respective desired output power level.

In an alternate version of step (2) in scan mode of operation, all the power estimates associated with valid wavelengths on the K$^{th}$ output optical fiber are read, following which a reference output power level for the carriers on the K$^{th}$ output optical fiber is computed.

Next, the difference between the reference output power level and the power estimate associated with a particular valid wavelength (e.g., the J$^{th}$ wavelength) on that K$^{th}$ output optical fiber is fed as an intensity control signal to the demultiplexer 558. The demultiplexer 558 is then controlled to send this intensity control signal to the appropriate one of the latches 556, which is used to drive the appropriate VOIC via the appropriate intensity control line 415$_{J,K}$.

This procedure is repeated for each output optical fiber (i.e., for each value of K). After a finite time, the output power level of each carrier on each output optical fiber (i.e., for each set of J and K corresponding to a valid combination) will have converged to the appropriate reference output power level.

It will be appreciated that either version of the scan mode of operation described above provides gain flattening which advantageously compensates for unequal and uncorrelated power levels among the carriers which would otherwise have occurred due to the arbitrary connection map applied by the photonic switch core 150 under control of the switch controller 160'.

Furthermore, it is noted that the optical power of each carrier is estimated only after the carrier has already exited the respective one of the WDM devices 130$_A$-130$_N$, located at the output of the photonic switch 400. Thus, the power equalization provided by the present invention is also capable of compensating for wavelength-dependent losses introduced by the WDM devices 130$_A$-130$_N$ as well as for and path-dependent losses through the photonic switch core 150.

Moreover, because only N couplers 420 are required and because each such coupler is associated with only one of the output optical fibers 140, another advantage of the invention is that the requirements on the tolerance of the couplers 420 need not be severe. This is due to the fact that variations in the flat loss between couplers causes a constant amplitude error across all wavelengths existing on a given fiber and therefore does not affect the spectral flatness. Moreover, such errors in the flat loss can be compensated for in the line system amplifiers 145, if the couplers 420 are placed in front of the amplifiers 145 and if the amount of compensation is within the amplifiers' dynamic range.

Having described the scan mode of operation, the need for a directed mode of operation arises in the situation where the controller 160' is ready to instruct the photonic switch core 150 to apply a new connection map. That is to say, a directed mode of operation is required when (I) one or more combinations which were previously not valid are now considered to be valid or (II) when valid connections are re-arranged. The reason for this is that suddenly adding new carriers or rearranging existing carriers can result in the disruption of those carriers which remain in service unchanged, due to the possibility of the new or rearranged optical carriers causing a sudden change in the optical amplifier gain or causing non-linear optical effects.

Figure 10:
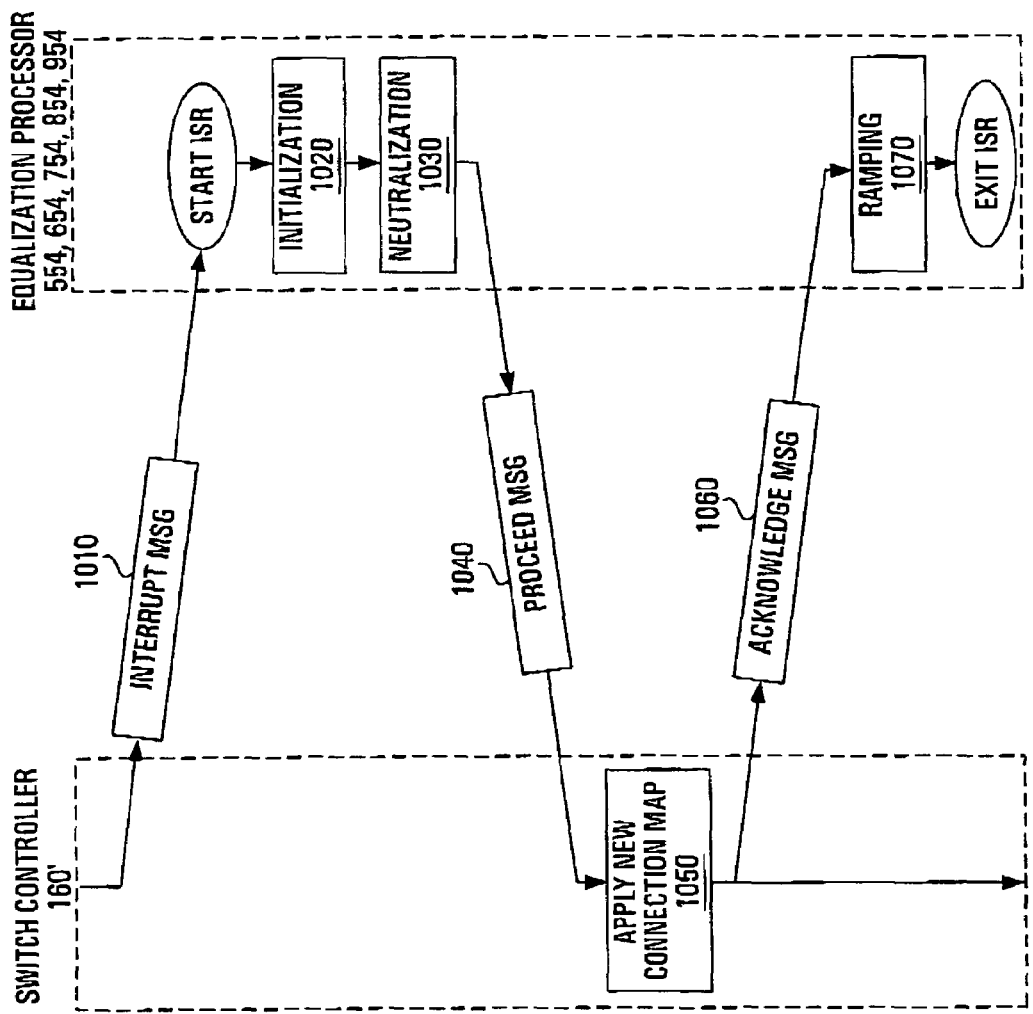
FIG. 10 shows a message flow diagram between controllers inside and outside the equalizer under transient conditions.

Accordingly, as shown in FIG. 10, the directed mode of operation is entered when an INTERRUPT message 1010 is received by the equalization processor from the switch controller 160'. The INTERRUPT message 1010 is indicative of the fact that a new connection map is about to be established by the switch controller 160' Specifically, the INTERRUPT message 1010 contains the identity of (A) all the combinations which are currently not valid but which will become valid as a result of the upcoming change to the connection map; (B) all the combinations which are currently valid but which will become invalid as a result of the upcoming change to the connection map; and (C) all the combinations which are currently valid and which are about to be rearranged.

Upon receipt of the INTERRUPT message 1010, the equalization processor enters an initialization routine 1020, whereupon the equalization processor proceeds to read the power estimate associated with: (i) each presently invalid but soon-to-be valid combination of wavelength and output optical fiber; and (ii) each presently valid and soon-to-be rearranged combination of wavelength and output optical fiber. The equalization processor then confirms that there is no carrier present on the combinations identified under (i) above. For the purposes of the reading the power estimate of a particular invalid but soon-to-be valid combination, it is understood that the respective intensity control signal should be set to a reasonable value (i.e., not to minimum gain/maximum attenuation).

Next, the equalization processor enters a neutralization routine 1030. Specifically, for each combination under (i) and (ii) above, the respective intensity control signal is ramped down to a value which provides minimum gain (or maximum attenuation, as appropriate). Setting the intensity to minimum gain/maximum attenuation is done in order to prevent the onset of disruptions to other carriers on the same output optical fiber upon adding the new or rearranged carrier, while the ramping down process mitigates the onset of disruptions to these other carriers during execution of the neutralization routine 1030 itself.

After having completed the neutralization routine 1030, the equalization processor sends a PROCEED message 1040 to the switch controller 160', authorizing it to proceed with the establishment of the new connection map. In response to receipt of the PROCEED message 1040, the switch controller 160' applies the new connection map at step 1050 and sends an ACKNOWLEDGE message 1060 back to the equalization processor. The ACKNOWLEDGE message 1060 indicates that the new connection map has been established.

In response to receipt of the ACKNOWLEDGE message 1060, the equalization processor proceeds to execution of a ramping routine 1070. The ramping routine 1070 consists of increasing the power level of each carrier that was neutralized in the neutralization routine 1030, i.e., each carrier associated with (a) each previously invalid but now valid combination of wavelength and output optical fiber; and (b) each previously valid and now rearranged combination of wavelength and output optical fiber. This increase in power level can be effected by increasing the value of the intensity control signal for each VOIC associated with a previously neutralized carrier from its minimum gain/maximum loss value (previously set in the neutralization routine 1030) to a value which brings the corresponding individual optical carrier signal to the same optical power level as the other individual optical carrier signals sharing the same output optical fiber.

As the value of the intensity control signal is being changed, the power estimates received from the power estimation module(s) will change and should therefore be given time to converge to new values. Hence, it is desirable to raise or lower the value of the appropriate intensity control signal in a gradual fashion, e.g., by ramping. The result of this ramping process will be to reduces the risk of affecting those wavelengths that already carry high speed optical data signals and that are not allowed to be disturbed.

Finally, before exiting the directed mode of operation, the equalization processor executes an update routine 1080, which consists of updating its list of valid and invalid combinations, based on the information in the INTERRUPT message 1010. (It is recalled that this list is consulted by the equalization processor while running in scan mode.) The equalization processor subsequently returns to scan mode.

Thus, through operation of the equalization processor in directed mode and interaction of the equalization processor with the switch controller 160', the present invention achieves the advantage of reducing disruptions to existing carriers due to changes in the connection map involving the addition or rearranging of one or more carriers on one of more output optical fibers.

Those skilled in the art will appreciate that many other embodiments are within the scope of the invention. For instance, instead of gradually decreasing and then increasing the power of each new or rearranged carrier, such carriers could be removed or introduced in an incremental fashion, i.e., in groups of one or two, etc. Thus, the neutralization routine 1030 could be represented by a process in which one intensity control signal at a time (or two intensity control signals at a time, etc.) is gradually or suddenly decreased to a minimum gain/maximum attenuation value.

Similarly, the ramping routine 1070 could be replaced by a procedure whereby the affected carriers are introduced one by one without the need for ramping but with a suitable delay between the introduction of each new carrier in order to allow the power estimates to converge to new values. The gradual introduction of carriers still reduces the risk of causing a hit on those wavelengths which already carry high speed optical data signals and which should not be disturbed.

Figure 12:
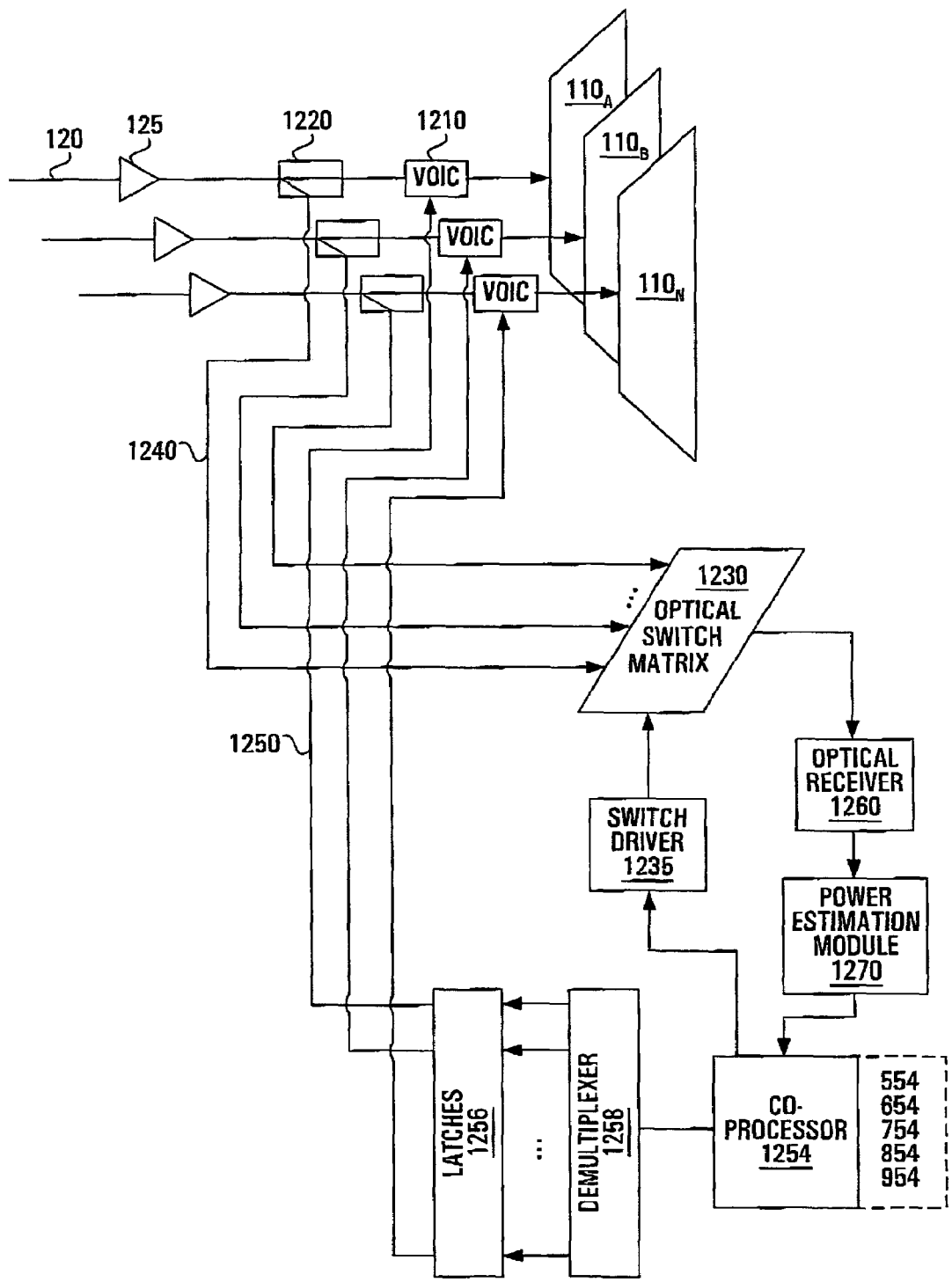
FIG. 12 is a block diagram of an embodiment of the photonic switch of the invention which uses coarse intensity control at the input to the switch.

FIG. 12 shows another variant of the photonic switch 400 of FIG. 4 which provides "coarse" intensity control at the input to each WDD device in the photonic switch 400. Specifically, a tap coupler (splitter) 1220 and a VOIC 1210 intercept each input optical fiber 120, between the respective amplifier 125 and the respective one of the WDD devices 110$_A$-110$_N$.

Each VOIC 1210 applies relatively flat gain or attenuation which affects all wavelengths on the given input optical fiber 120 to substantially the same degree. Thus, each VOIC 1210 should be capable of operating over a wider optical bandwidth than required for any of the VOICs 410. The amount of attenuation or gain to be applied by each VOIC 1210 is encoded by a respective intensity control signal arriving along a respective intensity control line 1250 from a plurality of latches 1256. The latches 1256 are driven by a demultiplexer 1258 that is fed by a co-processor 1254.

In the coarse equalization scheme of FIG. 12, the amount of gain or attenuation to be applied by each VOIC 1210 is controlled such that the aggregate optical power of the optical signal on each input optical fiber 120 is approximately the same before entering the respective one of the WDD devices 110$_A$-110$_N$. In order to measure this aggregate optical power, each tap coupler 1220 is connected by a respective optical path 1240 to a respective input of a common N-input optical switch matrix 1230.

The optical switch matrix 1230 can be identical to the switch matrices 710, 710' described with respect to FIGS. 7-9. It consists of a plurality of mirrors which can be controllably raised or lowered in order to let through the optical signal present on a selected one of the optical paths 1240. Control of the raising and lowering of mirrors in the optical switch matrix 1230 is achieved by the co-processor 1254 via an intervening switch driver 1235.

An output of the optical switch matrix 1230 is connected to an optical receiver 1260, which comprises circuitry such as a photodiode and a trans-impedance amplifier for converting into electrical form the optical signal present at its input. In the embodiment of FIG. 12, the signal received at the input to the optical receiver 1260 occupies multiple wavelengths and therefore the optical receiver 1260 must have a wide optical bandwidth of operation.

The output of the optical receiver 1260 is connected to a power estimation module 1270 which can be identical to any of the power estimation modules 530 suitable for use with the embodiments of FIGS. 5 through 9. The output of the power estimation module 1270 is fed to the co-processor 1254.

In operation, the co-processor 1254 (which can function independently of any of the processors 554, 654, 754, 854, 954 or can be integrated therewith) controls the raising and lowering of the mirrors in the optical switch matrix 1230 via the switch driver 1235 in order to obtain an aggregate power estimate, one input optical signal at a time, from the power estimation module 1270. The co-processor 1254 then compares each received power estimate to a reference and the difference is applied to the appropriate VOIC 1210 through control of the demultiplexer 1258 and the appropriate one of the latches 1256.

Thus, the co-processor 1254 strives to maintain all the aggregate input power levels at substantially the same value in a feed-forward fashion. In general, this coarse power level adjustment will produce a significant reduction in the spread among optical power levels on a particular output optical fiber 140, with the consequence that the dynamic range of the VOICs 410 (which are controlled by processor 554, 654, 754, 854 or 954) can be significantly reduced. This reduction in required dynamic range allows the use of less expensive VOICs 410 in each switched demuxed optical path 180.

Figure 12A:
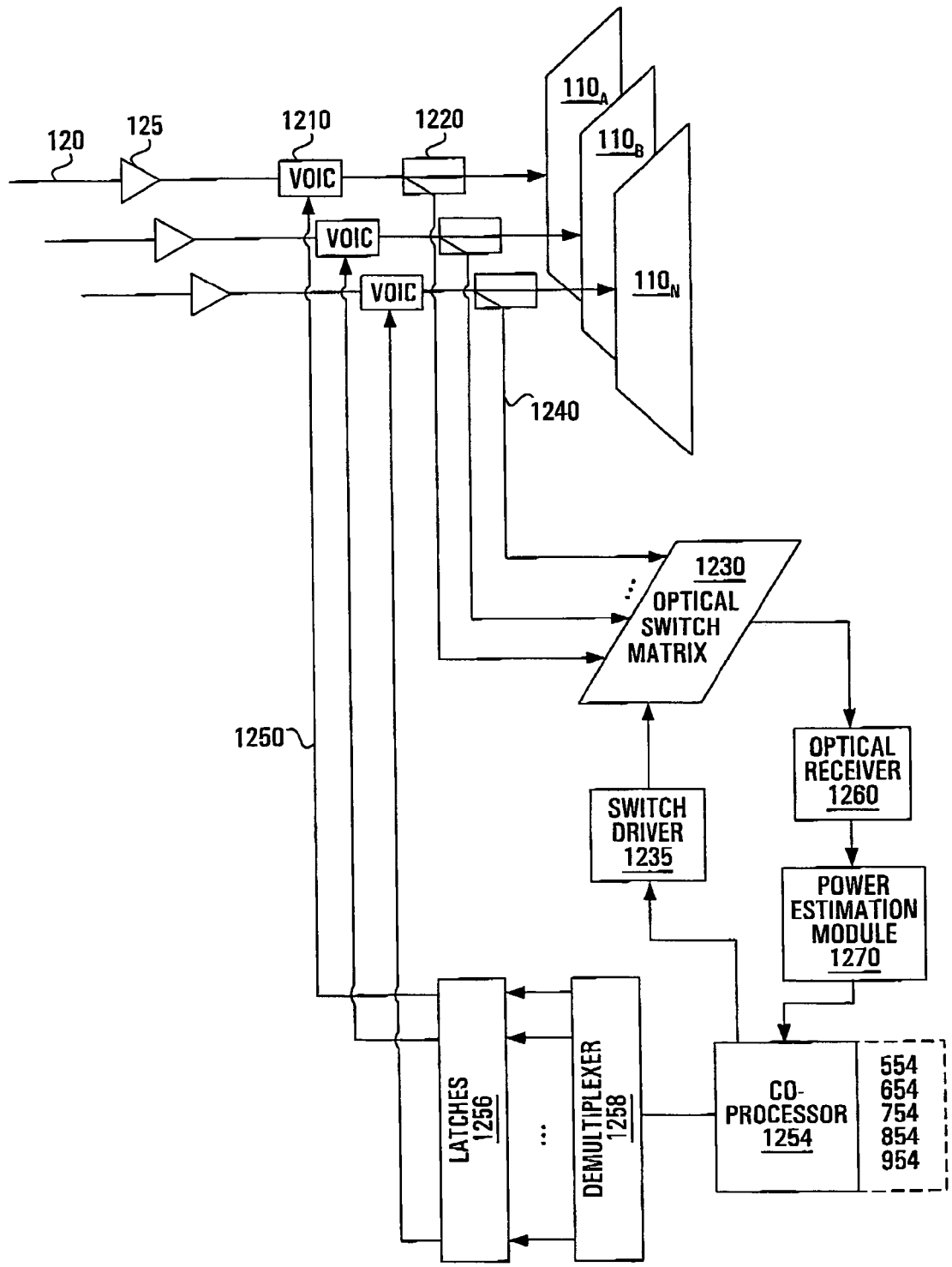
FIG. 12A shows a variation of the embodiment of FIG. 12.

It is also within the scope of the invention to provide coarse power equalization at the input end in the manner of a true feedback loop as shown in FIG. 12A. For improved performance, the order of the tap couplers 1220 and the VOICs 1210 along each input of the optical fibers 120 can be reversed as shown. Greater disparities in the loss of the various VOICs 1210 can then be tolerated due to the power 2 level measurements having been obtained via the tap couplers 1220 following (rather than before) application of intensity control by the VOICs 1210. When designing the feedback loop, however, those skilled in the art will of course recognize that special attention must be paid to stability concerns.

Those skilled in the art will also appreciate that in FIGS. 12 and 12A, the optical switch matrix 1230 and its associated switch driver 1235 can be omitted without affecting the way in which the coarse equalization scheme works. Specifically, it is within the scope of the invention to provide separate sets of optical receivers 1260 and power estimation modules 1270 in each optical path 1240. Any individual power estimate could then be accessed by the co-processor 1254 via a common intervening multiplexer (not shown).

Figure 13:
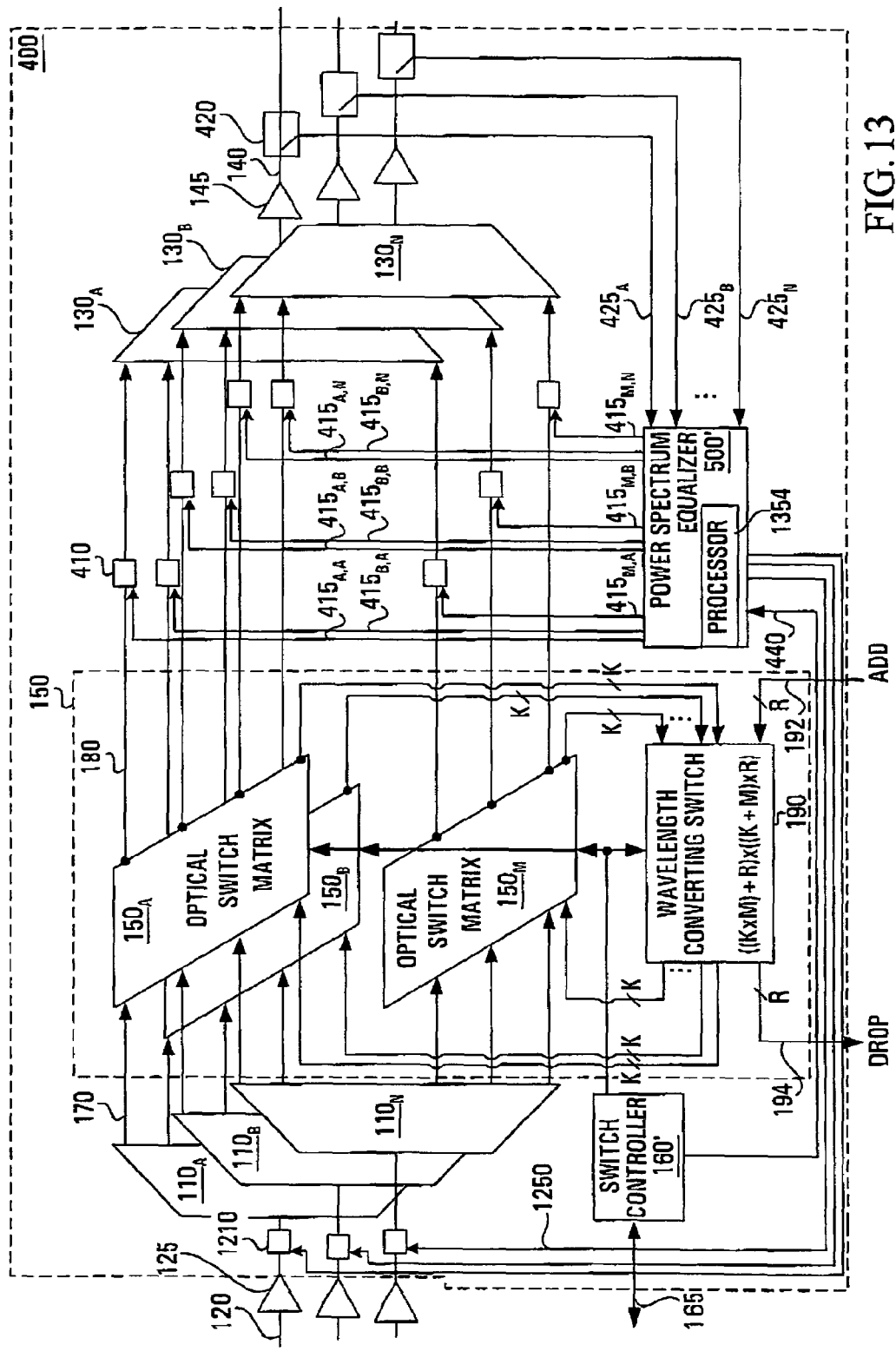
FIG. 13 is block diagram of another embodiment of the photonic switch of the invention which uses coarse intensity control at the input to the switch.

Other coarse equalization schemes can be implemented. For example, the couplers 1220, the optical switch matrix 1230, the switch driver 1235, the optical receiver 1260 and the power estimation module 1270 can be dispensed with while still providing coarse equalization at the input through the action of the VOICs 1210. Such an embodiment is shown in FIG. 13, where the co-processor (1254 in FIG. 12) and processor (554, 654, 754, 854, 954 in FIGS. 5-9) have been integrated into a single equalization processor 1354 in the equalizer 500'. As a result of the radical hardware simplification of the embodiment of FIG. 13 with respect to the embodiment of FIG. 12, the algorithm being run by the equalization processor 1354 is slightly more complex.

Specifically, the equalization processor 1354 operates in scan mode until it is interrupted by the switch controller 160', whereupon the equalization processor 1354 enters a directed mode of operation.

The actions performed by the equalization processor 1354 in directed mode, in respect of preparing for the appearance of a new or re-arranged carrier, remain unchanged from those described previously. However, it is the equalization processor's routine operation in scan mode which is slightly more complex because the equalization processor 1354 controls the amount of intensity variation applied by not one but both sets of VOICs 1210 and 410. Specifically, in each pass through the algorithm in scan mode, the equalization processor 1354 does not compute the "fine" gain or attenuation to be applied by the VOICs 410 until it has computed the "coarse" gain or attenuation to be applied by the VOICs 1210.

Since the power estimates available to the equalization processor 1354 are typically post-switching power estimates, and since the coarse intensity control is performed by the VOICs 1210 prior to switching, the controller 1354 must invert the connection map applied by the controller 160' in order to determine the amount of coarse intensity control it should apply at the input in order to result in a reduction in the power spread on each output optical fiber 140. Different ways of inverting a connection map will be known to those skilled in the art.

Practically, the equalization processor first determines the required gain for each individual demuxed switched optical path in the already described manner, and then determines how much of this gain or attenuation is common to all paths originating from the same input optical fiber. The common amount of intensity control is applied to the appropriate one of the VOICs 1210 and the remaining amount of intensity control for each demuxed switched optical path is applied to the appropriate VOIC 410.

In this way, the dynamic range required to be handled by the VOICs 410 can be significantly reduced, because each VOIC will only have to supply a residual amount of gain or attenuation. Thus, the hardware requirements are reduced with respect to the embodiment of FIG. 12, at the expense of a slight increase in computational complexity with respect to the controller 1254.

Of course, a similar coarse equalization scheme can be applied at the output of the WDM devices $130_A$-$130_N$, prior to tapping by the couplers 420. This embodiment is shown in FIG. 14, where each of the output optical fibers 140 is intercepted by a respective one of a plurality of VOICs $1410_A$-$1410_N$ placed between a respective one of the WDM devices $130_A$-$130_N$ and the respective coupler 420.

Figure 14:
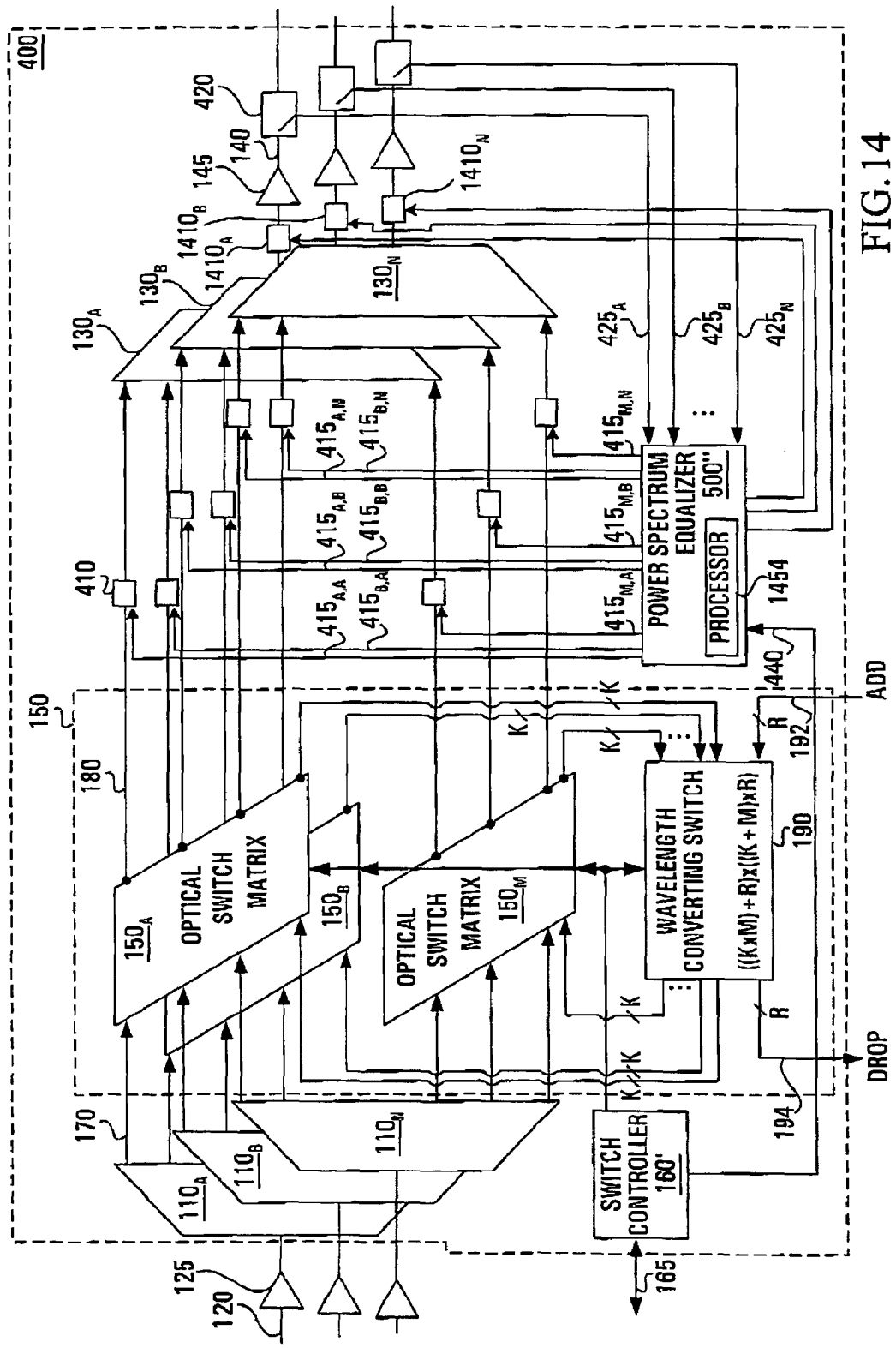
FIG. 14 is a block diagram of an embodiment of the photonic switch of the invention which uses coarse intensity control at the output of the switch.

In the case of FIG. 14, each of the VOICs $1410_A$-$1410_N$ applies a coarse amount of intensity control to all the wavelengths of the associated output optical fiber 140. Hence, the equalization processor 1454 in the equalizer 500" would determine the amount of required intensity control which is common to all wavelengths sharing an output optical fiber, would apply the common amount of intensity control to the appropriate one of the VOICs $1410_A$-$1410_N$ and would apply the amount of residual gain or attenuation to the appropriate VOICs 410.

Again, the dynamic range required to be handled by the VOICs 410 can be significantly reduced, because each will only have to supply a residual amount of gain or attenuation. This can significantly reduce the aggregate cost of the VOICs 410, at the expense of a slight increase in computational complexity with respect to the equalization processor 1454 in the equalizer 500". In fact, this embodiment is even simpler than the embodiment of FIG. 12 or FIG. 13 because it does not require knowledge of the connection map through the photonic switch core 150.

Further modifications and refinements of the above-described embodiments are within the scope of the invention. In particular, it is recalled that the embodiments of FIGS. 5, 7 and 8 employ WDD devices 510 within the equalizer 500 and the embodiments of FIGS. 7, 8 and 9 use one or more optical switch matrices 710, 710'. Due to the wavelength-dependent loss characteristics of the WDD devices 510 and due to path-dependent loss characteristics of the optical switch matrices 710, 710', it should be apparent that power level variations may be introduced by these components, depending on the specific path taken by light travelling from the couplers 420 to the equalization controller 500. Hence, losses inherent to the measurement process itself may distort the power estimates produced by the power estimation module(s) 530.

A solution to this problem is provided in FIG. 15, which illustrates an equalizer 1500 with a front end 1502, an optical receiver bank 1504, a power estimation module bank 1506 and an equalization controller 1510 which collectively encompass the embodiments previously described with reference to FIGS. 5 through 9. Additionally, the equalizer 1500 is equipped with calibration functionality. Specifically, in order to enable the computation of the loss of each possible path from the output optical fibers 140 to the equalization controller 1510, there is provided a calibration source 1520 for providing light of a desired wavelength and at a desired gain. The calibration source 1520 is fed by the equalization processor 1554 in the equalization controller 1510.

At the output of the calibration source 1520 is provided an (N+1)-way splitter 1530, which sends the incoming light from the calibration source 1520 along N+1 different optical fibers $1540_A$-$1540_N$, 1550. Optical fibers $1540_A$-$1540_N$ are coupled via a respective plurality of couplers $1560_A$-$1560_N$ to the N optical paths $425_A$-$425_N$ leading from the couplers 420. Optical fiber 1550 leads directly to the controller 1510 via an attenuator 1570, an optical receiver 1580 and a power estimation module 1590. The attenuator 1570 provides a fixed attenuation to account for the loss through the (N+1)-way splitter 1530.

In operation, the equalization processor 1554 operates in scan mode until the switch controller 160' indicates that it is about to change the connection map through the photonic switch core 150. Operation of the equalization processor 1554 in scan mode is virtually the same as previously described with reference to FIGS. 5 through 9, with one main variation.

Specifically, after evaluating the difference between a desired power level and the estimated power of a signal associated with a particular combination of wavelength and output optical fiber, the equalization controller 1510 adjusts this difference by a "calibration factor" associated with the path of that signal from the associated one of the couplers $1560_A$-$1560_N$ to the equalization controller 1510 through the front end 1502.

The "calibration factor" associated with a path represents the inverse of the relative loss of that path. One way in which the equalization processor 1554 may determine the calibration factor of a particular path through the front end 1502 is as follows:

select a wavelength;

instruct the calibration source 1520 to emit at that wavelength;

instruct the front end 1502 to pass through the desired wavelength along the desired path;

read from the power estimation module bank 1506 the power estimate corresponding to the desired wavelength arriving along the desired path;

read the power estimate received from the power estimation module 1590;

determine the difference between the two values and store the result as the calibration factor for that particular path.

The calibration factor of each path is not expected to change with time, since the properties of the components located between the couplers $1560_A$-$1560_N$ are not expected to change. Thus, the calibration step can be performed during an initialization phase. Still, in order to apply the appropriate calibration factor, it is necessary for the equalization processor 1554 to maintain an updated mapping of which combination of output optical fiber and wavelength is associated with which path.

Figure 15:
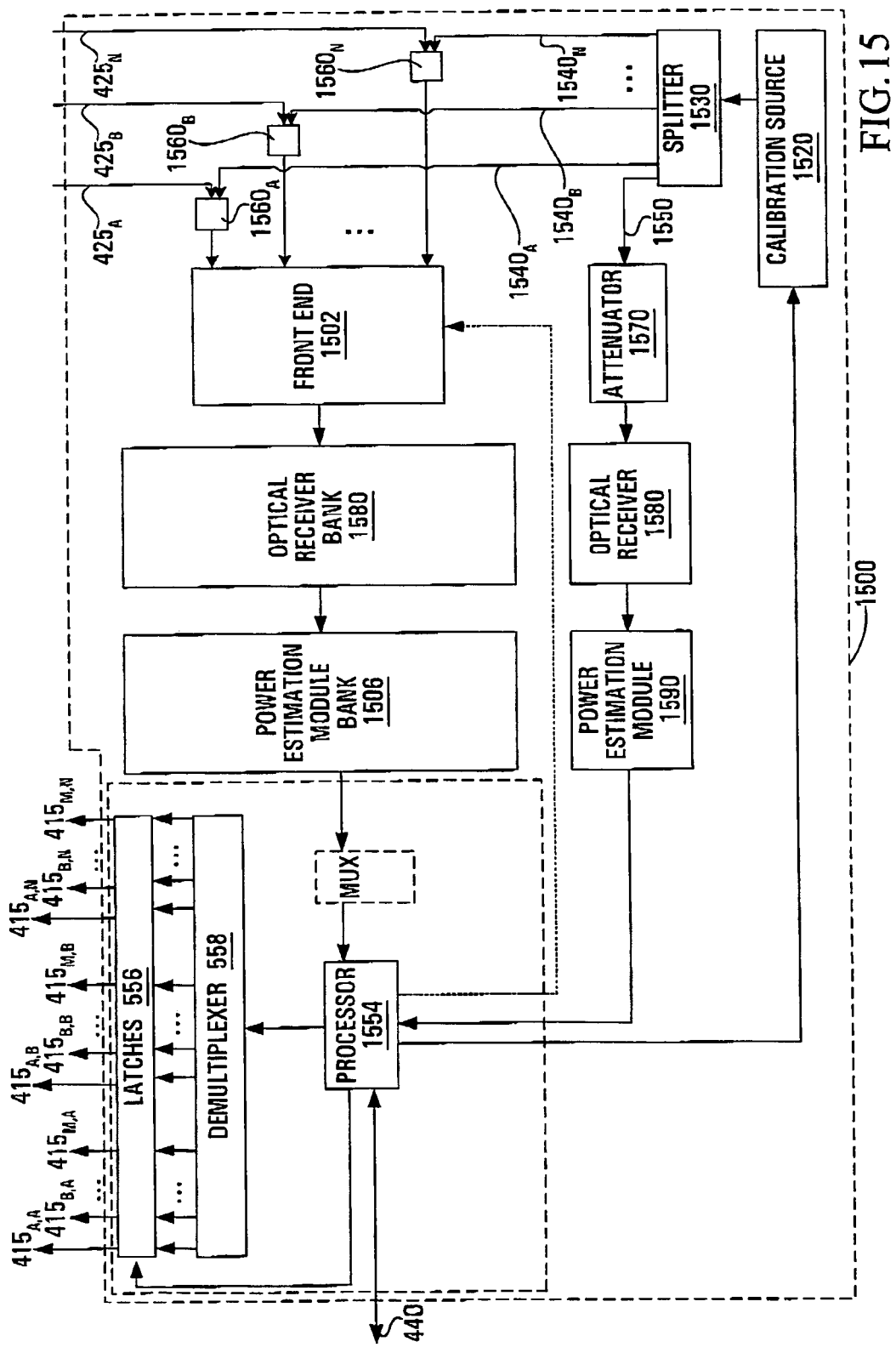
FIG. 15 is a block diagram of an embodiment of the photonic switch of the invention with calibration functionality.

By adjusting the intensity control signals provided to the VOICs 420 by the above-introduced calibration factors, the present invention as embodied in FIG. 15 advantageously compensates for errors which may otherwise have been introduced by the measurement process. Of course, it should be understood that the calibration is accurate to the degree that the properties of the optical receiver 1580 and power estimation module 1590 approximate those of the components in the optical receiver bank 1504 and the power estimation module bank 1506.

Figure 16:
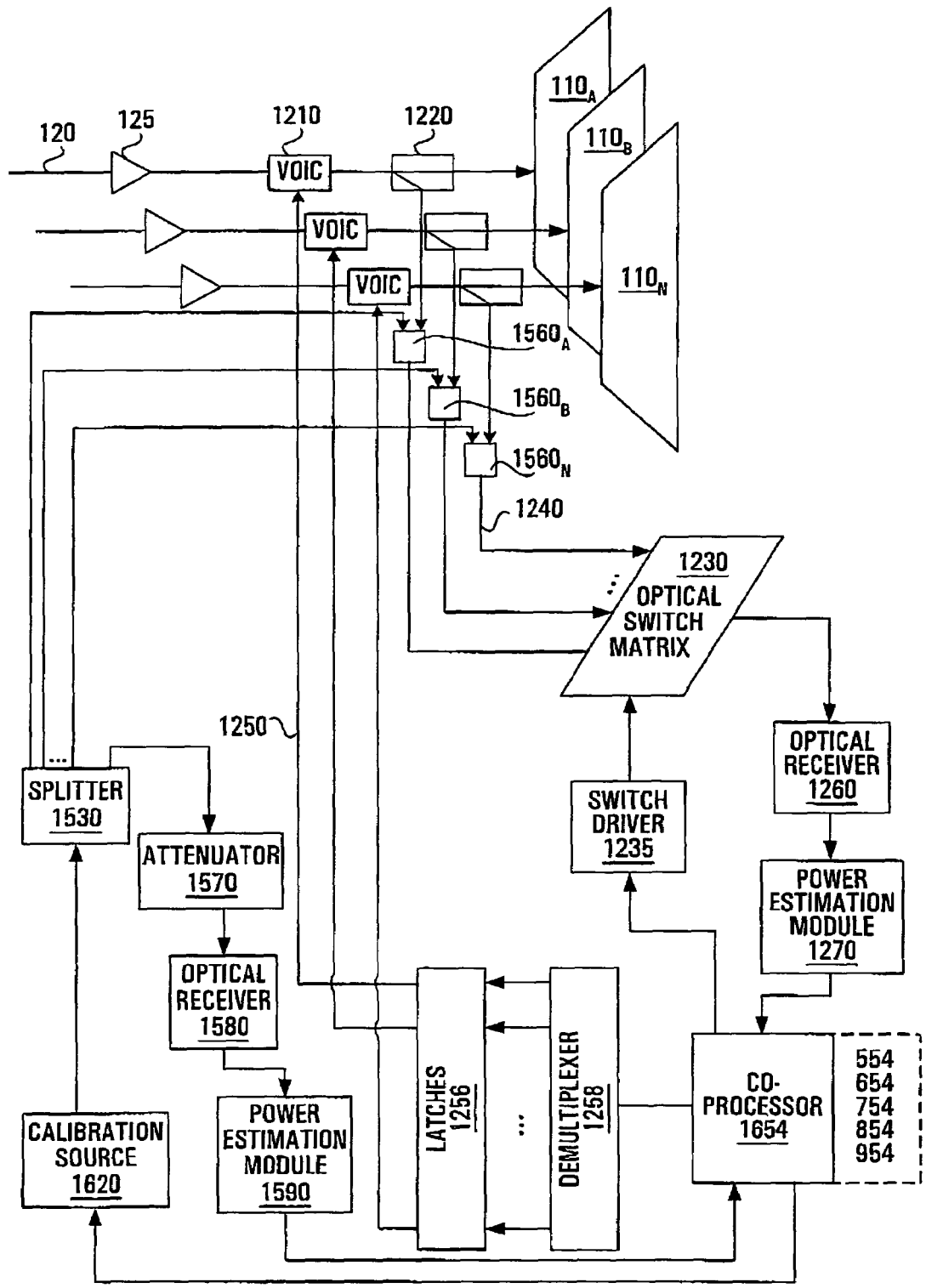
FIG. 16 shows the application of calibration functionality to the embodiment of FIG. 12A.

It should be appreciated that the calibration scheme of FIG. 15 can also be used in order to calibrate individual optical paths through either of the coarse equalization schemes previously described with reference to FIG. 12 or 12A. The application of the calibration scheme of FIG. 15 to the coarse equalization scheme of FIG. 12A is shown in FIG. 16, where the couplers $1560_A$-$1560_N$ are connected to the optical paths 1240 leading from the tap couplers 1220 connected to the input optical fibers 120. It is noted that the calibration source 1620 is a multi-colored light source which spans the same optical frequency range as any of the input WDM signals on the input optical fibers 120.

The co-processor 1654 operates as previously described with reference to FIG. 12. However, after evaluating the difference between a desired power level and the estimated power of an input WDM signal associated with a particular input optical fiber, the co-processor 1654 adjusts this difference by a "calibration factor" associated with that input optical fiber. This "calibration factor" represents the inverse of the relative loss of the path traveled by light coming from that input optical fiber through the associated one of the couplers $1560_A$-$1560_N$ and through the optical switch matrix 1230.

One way in which the co-processor 1654 may determine the calibration factor of a particular path through the optical switch matrix 1230 is as follows:

select an input optical fiber;

instruct the calibration source 1620 to emit multi-colored light;

instruct the optical switch matrix 1230 to pass through any light along the selected input optical fiber;

read from the power estimation module 1270 the power estimate corresponding to the selected input optical fiber;

read the power estimate received from the power estimation module 1590;

determine the difference between the two values and store the result as the calibration factor for that particular input optical fiber.

The calibration factor associated with each input optical fiber is not expected to change with time, since the properties of the components located between the couplers $1560_A$-$1560_N$ are not expected to change. Thus, the calibration step can be performed during an initialization phase.

It is seen that by adjusting the intensity control signals provided to the VOICs 1210 by these calibration factors, the present invention as embodied in FIG. 16 advantageously compensates for errors which may otherwise have been introduced during measurement of the intensity of each input WDM signal.

A further variation of the present invention involves placing the VOICs 410 at the input (rather than at the output) of the photonic switch core 150. Knowledge of the connection map would then be required in order to determine which of the switched individual optical carrier signals are combined by which WDM devices $130_A$-$130_N$. Also, it may be desirable in such a scenario to account for the dB loss of each signal through the photonic switch core 150, which loss would be constant so long as the connection map remains constant and would change as the connection map changes. Since this change is usually predictable to a good degree of accuracy, the equalization processor can adjust the intensity control signal supplied to each of the VOICs 410 by the respective known loss through the switch core 150.

In other embodiments of the invention, the output of the optical receivers 520 could be connected to functional units other than a power equalization system, such as a path integrity analyzer described in the co-pending U.S. patent application to Graves et al., entitled "Optical Switch with Connection Verification" and filed on even date. Of course, this assumes that the optical receivers 520 have sufficient electrical bandwidth to meet the functional requirements of the path integrity analyzer.

While specific embodiments of the present invention have been described and illustrated, it will be apparent to those skilled in the art that still further modifications and variations can be made without departing from the scope of the invention as defined in the appended claims.

We claim:

1. An optical intensity control system for use with an optical switch providing individual signal paths between a plurality of input ports and a plurality of output ports, said optical switch having a plurality of wavelength division multiplexers for combining sets of individual switched optical signals into multiplexed switched optical signals, the system comprising:

a plurality of optical splitters, each optical splitter being connectable to an output of a respective one of the plurality of wavelength division multiplexers;

a plurality of variable optical intensity controllers (VOICs) for insertion into respective ones of the individual signal paths and for individually controlling the intensity of optical signals present in said respective ones of the individual signal paths in accordance with respective intensity control signals; and an equalizer connected to the plurality of optical splitters and to the plurality of VOICs, for producing an estimate of optical power of each individual switched optical signal and generating the intensity control signals as a function of the estimates of optical power.

2. The optical intensity control system as claimed in claim 1, wherein the equalizer comprises:

for each of the plurality of optical splitters, a wavelength division demultiplexer connected to an output of said optical splitter;

for each wavelength division demultiplexer, a plurality of optical receivers connected to said wavelength division demultiplexer;

for each of the plurality of optical receivers, a power estimator connected thereto; and a common controller connected to each power estimator;

said common controller being adapted to read a power estimate from each power estimator and to generate said intensity control signals as a function thereof.

3. A system as claimed in claim 2, wherein each optical receiver is a narrow-optical-bandwidth optical receiver tuned to a single optical wavelength.

4. A system as claimed in claim 2, wherein the intensity control signals are produced sequentially as a time-division-multiplexed intensity control signal, the equalizer further comprising:

a demultiplexer having a data input and a control input both connected to the processor and having a plurality of outputs, for receiving the time-division-multiplexed intensity control signal at the data input for controllably distributing time-based portions of the time-division-multiplexed intensity control signal to selected ones of its outputs as a function of the signal received at its control input; and a latching circuit having a plurality of inputs connected to the outputs of the demultiplexer, a plurality of outputs connected to the VOICs and a control input connected to the processor, for transferring the value at any one of its inputs to the corresponding output in response to the signal received at its control input and subsequently holding that value.

5. A system as claimed in claim 1, wherein the equalizer comprises:

a front end circuit having a plurality of inputs for receiving the multiplexed switched optical signals, the front end circuit being adapted to controllably isolate individual switched optical signals from the multiplexed switched optical signals;

an optical receiver unit connected to the front end circuit, for converting any isolated individual switched optical signals to electrical signals;

a power estimation unit connected to the optical receiver unit, for time-averaging the electrical signals, thereby to obtain respective estimates of optical power; and a processor connected to the power estimated unit and to the front end circuit, the processor being adapted to cause the front end circuit to isolate selected individual switched optical signals, the processor being further adapted to generate the intensity control signals from the estimates of optical power.

6. A system as claimed in claim 5, wherein the front end circuit comprises, for each of the optical splitters, a wavelength-tunable optical bandpass filter connected to an output of said splitter;

wherein the processor is further adapted to selectably tune the filters in order to cause the selected individual switched optical signals to be isolated.

7. A system as claimed in claim 5, further comprising:

a reference path having a reference optical receiver connected in series with a reference power estimation unit, the reference power estimation unit having an output connected to the processor; and a reference light source for controllably emitting light having a selectable wavelength, the output of the reference light source being coupled to each multiplexed switched optical signal at the input of the front end circuit and also being coupled to an input of the reference optical receiver.

8. A system as claimed in claim 7, wherein the reference light source is connected to the processor and wherein the processor is further adapted to:

obtain from the reference power estimation unit a reference estimate of the optical power of the reference light course while bypassing the front end circuit;

apply control to the front end circuit in order to obtain an estimate of the optical power of the reference light source for each combination of a multiplexed switched optical signal and a wavelength on that signal;

determine a calibration factor for each said combination by evaluating a function of the reference estimate and the power estimate corresponding to said combination; and adjust the intensity control signal associated with each switched individual optical signal by the calibration factor associated with the particular combination of multiplexed switched optical signal and wavelength corresponding to that switched individual optical signal.

9. A system as claimed in claim 7, wherein said reference light source is tunable under control of the processor.

10. A system as claimed in claim 1, wherein the front end circuit comprises:

an optical switch matrix having a plurality of inputs respectively connected to the plurality of splitters and having a plurality of controllable erectable mirrors; and a wavelength division demultiplexer connected to an output of said switch matrix;

wherein the processor is further adapted to selectably raise one mirror at a time on the optical switch matrix in order to cause selected individual switched optical signals to be isolated.

11. A system as claimed in claim 10, wherein the optical receiver unit comprises narrow-optical-bandwidth optical receivers each tuned to a single, distinct optical wavelength.

12. A system as claimed in claim 1, wherein the front end circuit comprises:

a first optical switch matrix having a plurality of inputs respectively connected to the plurality of splitters and having a plurality of controllably erectable mirrors;

a wavelength division demultiplexer connected to an output of said first switch matrix; and at least one second optical switch matrix, each said second optical switch matrix having a plurality of inputs connected to the wavelength division demultiplexer and having a plurality of controllable erectable mirrors;

wherein the processor is further adapted to selectably raise one mirror at a time on the first optical switch matrix and to raise one mirror at a time on the at least one second optical switch matrix in order to cause selected individual switched optical signals to be isolated.

13. A system as claimed in claim 1, wherein the front end circuit comprises:

a first optical switch matrix having a plurality of inputs respectively connected to the plurality of splitters and having a plurality of controllable erectable mirrors;

a wavelength division demultiplexer connected to an output of said first switch matrix;

at least one second optical switch matrix, each said second optical switch matrix having a plurality of inputs connected to the wavelength division demultiplexer and having a plurality of controllably erectable mirrors; and a coupler connected to an output of each second optical switch matrix;

wherein the processor is further adapted to selectably raise one mirror at a time on the first optical switch matrix and to raise one mirror at a time on the at least one second optical switch matrix in order to cause selected individual switched optical signals to be isolated.

14. A system as claimed in claim 1, wherein the front end circuit comprises:
an optical switch matrix having a plurality of inputs respectively connected to the plurality of splitters and having a plurality of controllably erectable mirrors; and
a wavelength-tunable optical bandpass filter connected to an output of said optical switch matrix;
wherein the processors is further adapted to selectably tune the filter and to selectably raise one mirror at a time on the optical switch matrix in order to cause selected individual switched optical signals to be isolated.

15. A switch for optical signals, comprising:
a plurality of wavelength division demultiplexers, each having a demultiplexer input port and a plurality of demultiplexer output ports;
a plurality of wavelength division multiplexers, each having a plurality of multiplexer input ports and a multiplexer output port;
a plurality of optical splitters, each being connected to the multiplexer output port of a respective one of the wavelength division multiplexers;
a switching core connected between the wavelength division demultiplexers and the wavelength division multiplexers, for providing an optical path from each demultiplexer output port to any one of a corresponding plurality of the multiplexer input ports;
a plurality of variable optical intensity controllers (VOICs) positioned in respective ones of the optical paths, each VOIC being arranged to control the intensity of a narrow-optical-bandwidth optical signal present in the respective optical path in accordance with a respective intensity control signal; and
an equalizer connected to the couplers and to the VOICs, for producing an estimate of the optical power of each narrow-optical-bandwidth optical signal after switching by the switching core and for generating the intensity control signals as a function of the estimates of optical power.

16. A switch as claimed in claim 15, wherein the VOICs are positioned between the switching core and the wavelength division multiplexers.

17. A switch as claimed in claim 15, wherein the VOICs are positioned between the wavelength division demultiplexers and the switching core.

18. A switch as claimed in claim 15, wherein the equalizer comprises:
for each of the optical splitters, a corresponding wavelength division demultiplexer connected to an output of said splitter;
for each wavelength division demultiplexer in the equalizer, a plurality of optical receivers connected to said demultiplexer;
for each optical receiver, a power estimator connected thereto; and
a common controller connected to each power estimator;
said controller being adapted to read a power estimate from each power estimator and to generate said intensity control signals as a function thereof.

19. A switch as claimed in claim 18, wherein each optical receiver is a narrow-optical-bandwidth optical receiver tuned to a single optical wavelength.

20. A switch as claimed in claim 15, wherein the equalizer comprises:
for each of the optical splitters, a corresponding wavelength-tunable optical bandpass filter connected to an output of said splitter;
for each filter, a corresponding wide-optical-bandwidth optical receiver connected thereto;
for each optical receiver, a corresponding power estimator connected thereto; and
a controller connected to the power estimators and to the filters;
said controller being adapted to selectably tune the filters, to read power estimates from the power estimators and to generate said intensity control signals as a function of the power estimates.

21. A switch as claimed in claim 15, wherein the equalizer comprises:
an optical switch matrix having a plurality of inputs respectively connected to the plurality of splitters and having a plurality of controllably erectable mirrors;
a wavelength division demultiplexer connected to an output of said switch matrix;
a plurality of optical receivers connected to said demultiplexer in the equalizer;
a plurality of power estimators respectively connected to the plurality of optical receivers; and
a controller being adapted to selectably raise one mirror at a time on the optical switch matrix, to read power estimates from the power estimators and to generate said intensity control signals as a function of the power estimators.

22. A switch as claimed in claim 21, wherein each optical receiver is a narrow-optical-bandwidth optical receiver tuned to a single optical wavelength.

23. A switch as claimed in claim 21, wherein the switching core comprises a plurality of core optical switching matrixes, each core optical switch matrix being associated with a distinct optical wavelength.

24. A switch as claimed in claim 23, wherein the switching core further comprises a wavelength-converting inner-matrix switch connected to the core optical switching matrices, for receiving optical signals from the core optical switching matrices, converting each received optical signal to electrical form and transmitting each converted signal at a changed wavelength to the core optical switch matrix associated with the changed wavelength.

25. A switch as claimed in claim 24, wherein at least one optical switch matrix in the equalizer is in a stacked relationship with respect to one or more core optical switch matrices.

26. A switch as claimed in claim 25, wherein at least one optical switch matrix in the equalizer is parallel to and aligned with one or more core optical switch matrices.

27. A switch as claimed in claim 15, wherein the equalizer comprises:
a first optical switch matrix having a plurality of inputs respectively connected to the plurality of splitters and having a plurality of controllably erectable mirrors;
a wavelength division demultiplexer connected to an output of said first switch matrix;
at least one second optical switch matrix, each said second optical switch matrix having a plurality of inputs connected to the wavelength division demultipexer in the equalizer and having a plurality of controllably erectable mirrors;
for each second optical switch matrix, a corresponding optical receiver connected to an output thereof;

for each optical receiver, a corresponding power estimator connected thereto; and a controller connected to the power estimators, to the first optical switch matrix and to the at least one second optical switch matrix;

said controller being adapted to selectably raise one mirror at a time on the first optical switch matrix, to raise one mirror at a time on the at least one second optical switch matrix, to read power estimates from the power estimators and to generate said intensity control signals as a function of the power estimates.

28. A switch as claimed in claim 27, wherein the switching core comprises a plurality of core optical switching matrices, each core optical switch matrix being associated with a distinct optical wavelength.

29. A switch as claimed in claim 28, wherein the switching core further comprises a wavelength-converting inner-matrix switch connected to the core optical switching matrices, for receiving optical signals from the core optical switching matrices, converting each received optical signal to electrical form and transmitting each converted signal at a changed wavelength to the core optical switch matrix associated with the changed wavelength.

30. A switch as claimed in claim 29, wherein at least one optical switch matrix in the equalizer is in a stacked relationship with respect to one or more core optical switch matrices.

31. A switch as claimed in claim 29, wherein at least one optical switch matrix in the equalizer is parallel to and aligned with one or more core optical switch matrices.

32. A switch as claimed in claim 15, wherein the equalizer comprises:
a first optical switch matrix having a plurality of inputs respectively connected to the plurality of splitters and having a plurality of controllably erectable mirrors;
a wavelength division demultiplexer connected to an output of said first switch matrix;
at least one second optical switch matrix, each said second optical switch matrix having a plurality of inputs connected to the wavelength division demultiplexer in the equalizer and having a plurality of controllably erectable mirrors;
a coupler connected to an output of each second optical switch matrix;
a wide-optical-bandwidth optical receiver connected to the coupler;
a power estimator connected to said optical receiver; and
a controller connected to the power estimator, to the first optical switch matrix and to the at least one second optical switch matrix;
said controller being adapted to selectably raise one mirror at a time on the first optical switch matrix, to raise one mirror at a time on the at least one second optical switch matrix, to read power estimates from the power estimator and to generate said intensity control signals as a function of the power estimates.

33. A switch as claimed in claim 32, wherein the switching core comprises a plurality of core optical switching matrices, each core optical switch matrix being associated with a distinct optical wavelength.

34. A switch as claimed in claim 33, wherein the switching core further comprises a wavelength-converting inter-matrix switch connected to the core optical switching matrices, for receiving optical signals from the core optical switching matrices, converting each received signal to electrical form and transmitting each converted signal at a changed wavelength to the core optical switch matrix associated with the changed wavelength.

35. A switch as claimed in claim 34, wherein at least one optical switch matrix in the equalizer is in a stacked relationship with respect to one or more core optical switch matrices.

36. A switch as claimed in claim 34, wherein at least one optical switch matrix in the equalizer is parallel to and aligned with one or more core optical switch matrices.

37. A switch as claimed in claim 15, where the equalizer comprises:
an optical switch matrix having a plurality of input respectively connected to the plurality of splitters and having a plurality of controllably erectable mirrors;
a wavelength-tunable optical bandpass filter connected to an output of said optical switch matrix;
a wide-optical-bandwidth optical receiver connected to said filter;
a power estimator connected to said optical receiver; and
a controller connected to the power estimator, to the filter and to the optical switch matrix;
said controller being adapted to selectably tune the filter, to selectably raise one mirror at a time on the optical switch matrix, to read power estimates from the power estimator and to generate said intensity control signals as a function of the power estimates.

38. A switch as claimed in claim 37, wherein the switching core comprises a plurality of core optical switching matrices, each core optical switch matrix being associated with a distinct optical wavelength.

39. A switch as claimed in claim 38, wherein the switching core further comprises a wavelength-converting inter-matrix switch connected to the core optical switching matrices, for receiving optical signals from the core optical switching matrices, converting each received signal to electrical form and transmitting each converted signal at a changed wavelength to the core optical switch matrix associated with the changed wavelength.

40. A switch as claimed in claim 39, wherein at least one optical switch matrix in the equalizer is in a stacked relationship with respect to one or more core optical switch matrices.

41. A switch as claimed in claim 39, wherein at least one optical switch matrix in the equalizer is parallel to and aligned with one or more core optical switch matrices.

42. A switch as claim in claim 15, further comprising:
a plurality of second VOICs, each connected between the multiplexer output port of a respective one of the wavelength division multiplexers and the corresponding splitter, for controlling the intensity of multiplexed switched optical signal exiting the wavelength division multiplexers in accordance with a respective second intensity control signals;
wherein the equalizer is further adapted to generate the second intensity control signals as a function of the power estimates.

43. A switch as claimed in claim 15, further comprising:
a plurality of second VOICs, each connected to the demultiplexer input port of a respective one of the wavelength division demultiplexers connected to the switching core, the second VOICs being arranged to control the intensity of multiplexed switched optical signals entering the wavelength division demultiplexers in accordance with respective second intensity control signals;
wherein the equalizer is further adapted to generate the second intensity control signals as a function of the power estimates.

44. A switch as claimed in claim 15, further comprising:
a plurality of second optical splitters, each being optically connected to the demultiplexer input port of a respective one of the wavelength division demultiplexers and being arranged to tap a fractional amount of light carrying a respective unswitched wavelength division multiplexed signal;

a plurality of second VOICs, each being optically connected between a respective second optical splitter and the corresponding wavelength division demultiplexer and being arranged to control the intensity of the respective unswitched wavelength division multiplexed signal in accordance with a respective second intensity control signal; and a wide-optical-bandwidth power estimation unit connected to the second optical splitters, for estimating the average optical power of the unswitched wavelength division multiplexed signals;

wherein the equalizer is adapted to generate the second intensity control signals as a function of the power estimates received from the wide-optical-bandwidth power estimation unit.

45. A switch as claimed in claim 15, further comprising:

a plurality of second VOICs, each being optically connected to the demultiplexer input port of a respective one of the wavelength division demutiplexers and being arranged to control the intensity of a respective unswitched wavelength division multiplexed signal in accordance with a respective second intensity control signal;

a plurality of second optical splitters, each being optically connected between a respective one of the second VOICs and the corresponding wavelength division demultiplexer and being arranged to tap a fractional amount of light carrying the respective unswitched wavelength division multiplexed signal; and a wide-optical-bandwidth power estimation unit connected to the second optical splitters, for estimating the average optical power of the unswitched wavelength division multiplexed signals;

wherein the equalizer is adapted to generate the second intensity control signals as a function of the power estimates received from the wide-optical-bandwidth power estimation unit.

46. A switch as claimed in claim 45, further comprising:

a reference optical path comprising a reference optical receiver connected in series with a reference power estimation unit, the reference power estimation unit having an output connected to the processor; and a reference light source having an output coupled to each unswitched wavelength division multiplexed signal at the input of the wide-optical-bandwidth power estimation unit and also being coupled to an input of the reference optical receiver.

47. A system as claimed in claim 46, wherein the reference light source is connected to the processor by a control link and wherein the processor is further adapted to:

obtain from the reference power estimation unit a reference estimate of the optical power of the reference light source;

apply control to the wide-optical-bandwidth power estimation unit in order to obtain an estimate of the optical power of each unswitched wavelength division multiplexed signal;

determine a calibration factor for each unswitched wavelength division multiplexed signal by evaluating the function of (I) the reference estimate and (II) the power estimate of the unswitched wavelength division multiplexed signal; and adjust the second intensity control signal associated with each unswitched wavelength division multiplexed signal by the associated calibration factor.

48. A switch as claimed in claim 15, wherein the equalizer comprises:

a front end circuit having a plurality of inputs for receiving the multiplexed switched optical signals, the front end circuit being adapted to controllably admit individual switched optical signals from the multiplexed optical signals;

an optical receiver unit connected to the front end circuit, for converting any admitted individual switched optical signals to electrical signals;

a power estimation unit connected to the optical receiver unit, for time-averaging the electrical signals, thereby to obtain respective estimates of optical power; and a processor connected to the power estimation unit and to the front end circuit, the processor being adapted to cause the front end circuit to admit selected individual switched optical signals, the processor being further adapted to generate the intensity control signals from the estimates of optical power.

49. A switch as claimed in claim 48, wherein the intensity control signals are produced sequentially as a time-division-multiplexed intensity control signal, the equalizer further comprising:

a demultiplexer having a data input and a control input both connected to the processor and having a plurality of outputs, for receiving the time-division-multiplexed intensity control signal at the data input and for controllably distributing time-based portions of the time-division-multiplexed intensity control signal to selected ones of its outputs as a function of the signal received at its control input; and a latching circuit having a plurality of inputs connected to the outputs of the demultiplexer, a corresponding plurality of outputs connected to the VOICs and a control input connected to the processor, for transferring the value at any one of its inputs to the corresponding output in response to the signal received at its control input and subsequently holding that value.

50. A switch as claimed in claim 48, further comprising:

a reference path having a reference optical receiver connected in series with a reference power estimation unit, the reference power estimation unit having an output connected to the processor; and a reference light source for controllably emitting light having a selectable wavelength, the output of the reference light source being coupled to each multiplexed optical signal at the input of the front end circuit and also being coupled to an input of the reference optical receiver.

51. A switch as claimed in claim 50, wherein the reference light source is connected to the processor and wherein the processor is further adapted to:

obtain from the reference power estimation unit a reference estimate of the optical power of the reference light source without the effect of the front end circuit;

apply control the to front end circuit in order to obtain an estimate of the optical power of the reference light source for each combination of a multiplexed switched optical signal and a wavelength on that signal;

determine a calibration factor for each said combination by evaluating a function of the reference estimate and the power estimate corresponding to said combination; and adjust the intensity control signal associated with each switched individual optical signal by the calibration factor associated with the particular combination of multiplexed switched optical signal and wavelength corresponding to that switched individual optical signal.

52. A switch as claimed in claim 50, wherein said reference light source is tunable under control of the processor.

* * * * *